US009012533B2

(12) United States Patent
Schneider et al.

(10) Patent No.: US 9,012,533 B2
(45) Date of Patent: Apr. 21, 2015

(54) FIBER-REINFORCED RESIN COMPOSITES AND METHODS OF MAKING THE SAME

(71) Applicant: The Boeing Company, Chicago, IL (US)

(72) Inventors: Terrence Lee Schneider, Puyallup, WA (US); Stephen Christensen, Sammamish, WA (US); Jonathan Henry Gosse, Issaquah, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 14/172,040

(22) Filed: Feb. 4, 2014

(65) Prior Publication Data

US 2015/0080494 A1    Mar. 19, 2015

Related U.S. Application Data

(63) Continuation-in-part of application No. 12/967,512, filed on Dec. 14, 2010.

(51) Int. Cl.
*C08K 9/04* (2006.01)
*C08J 5/06* (2006.01)

(52) U.S. Cl.
CPC .............. *C08J 5/06* (2013.01); *C08J 2300/00* (2013.01); *C08J 2463/00* (2013.01)

(58) Field of Classification Search
USPC ................................................ 523/205, 206
See application file for complete search history.

(56) References Cited

U.S. PATENT DOCUMENTS

| | | |
|---|---|---|
| 3,864,203 A | 2/1975 | Marzocchi |
| 4,663,401 A | 5/1987 | Saito et al. |
| 4,842,933 A | 6/1989 | Cizmecioglu |
| 4,972,031 A | 11/1990 | Choate et al. |
| 7,105,120 B2 | 9/2006 | Skinner et al. |
| 7,745,549 B2 | 6/2010 | Christensen et al. |
| 2012/0149802 A1 | 6/2012 | Schneider et al. |

FOREIGN PATENT DOCUMENTS

| | | |
|---|---|---|
| WO | WO2010007163 A1 | 1/2010 |
| WO | WO2012082280 A1 | 6/2012 |

OTHER PUBLICATIONS

Finegan et al., "Improvement of Damping at the Micromechanical Level in Polymer Composite Materials Under Transverse Normal Loading by the Use of Special Fiber Coatings," Journal of Vibrations and Acoustics, vol. 120, Apr. 1998, pp. 623-627.
Finegan et al., "Analytical Modeling of Damping at Micromechanical Levels in Polymer Composites Reinforced with Coated Fibers," Composites Science and Technology, vol. 60, 2000, pp. 1077-1084.
Hwang et al., "Prediction of Fiber-Matrix Interphase Effects on Damping of Composites Using a Micromechanical Strain/Energy Finite Element Approach," Composites Engineering, vol. 3, No. 10, 1993, pp. 975-984.
Hwang et al., "The Use of Strain Energy-Based Finite Element Techniques in the Analysis of Various Aspects of Damping of Composite Materials and Structures," Journal of Composite Materials, vol. 26, No. 17, 1992, pp. 2585-2605.
Kobayashi et al., "Suppression of Microscopic Damage in Epoxy-Based Composites Using Flexible Interphase," Journal of Materials Science Letters, vol. 22, 2003, pp. 1315-1318.
Kobayashi et al., "Improvement in Damage Tolerance of CFRP Laminate Using the Hybridization Method," Composite Interfaces, vol. 12, No. 7, 2005, pp. 629-635.
Maligno et al., "Effects of Interphase Material Properties in Unidirectional Fibre Reinforced Composites," Composites Science and Technology, vol. 710, 2010, pp. 36-44.
Neagu et al., "Micromechanics and Damping Properties of Composites Integrating Shear Thickening Fluids," Composites Science and Technology, vol. 69, 2009, pp. 515-522.
Nishiwaki et al., "Static and Dynamic Properties of Unidirectional CFRP Laminates with Flexible Interphase," Composite Interfaces, vol. 9, No. 3, 2002, pp. 247-258.

*Primary Examiner* — Vicky Nerangis
(74) *Attorney, Agent, or Firm* — Yee & Associates, P.C.

(57) ABSTRACT

A fiber-reinforced resin composite and method of making the same. The fiber-reinforced resin composite includes a polymeric resin matrix and a plurality of fibers coated with a first distortional polymeric resin. The polymeric resin matrix has a first von Mises strain. The first distortional polymeric resin has a second von Mises strain in a range of approximately 0.25 to approximately 0.45. The plurality of fibers coated with the first distortional polymeric resin are disposed in the polymeric resin matrix. The second von Mises strain is greater than the first von Mises strain.

17 Claims, 9 Drawing Sheets

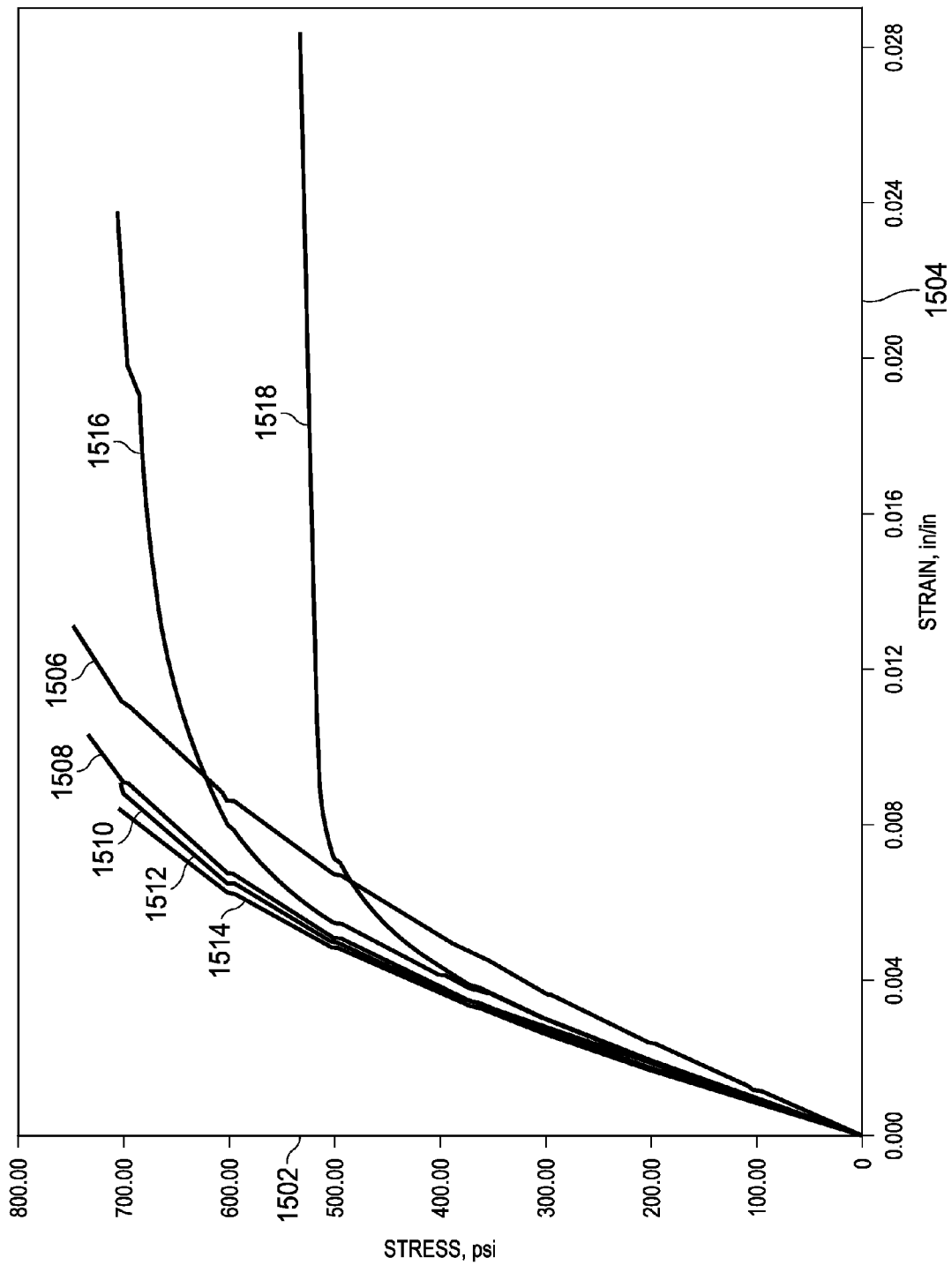

FIBER-REINFORCED RESIN COMPOSITES AND METHODS OF MAKING THE SAME

CROSS REFERENCE TO RELATED APPLICATIONS

The present application is a continuation-in-part (CIP) of and claims priority from commonly owned U.S. patent application Ser. No. 12/967,512, filed Dec. 14, 2010 and published as US 2012/0149802 A1, entitled "Composites Having Distortional Resin Coated Fibers" and having named inventors Terry Lee Schneider, Stephen Christensen, and Jonathan Henry Gosse, which is incorporated herein in its entirety.

BACKGROUND INFORMATION

1. Field

The present disclosure relates generally to fiber-reinforced resin composites and deals more particularly with a composite having fibers coated with a distortional resin.

2. Background

Aircraft are being designed and manufactured with greater and greater percentages of composite materials. Composite materials are used in aircraft to decrease the weight of the aircraft. This decreased weight improves performance features such as payload capacities and fuel efficiencies. Further, composite materials provide longer service life for various components in an aircraft.

Composite materials may be tough, light-weight materials created by combining two or more functional components. For example, a composite material may include reinforcing fibers bound in a polymeric resin matrix. The fibers may be unidirectional or may take the form of a woven cloth or fabric. The fibers and resins may be arranged and cured to form a composite material.

In fiber-reinforced composites, the efficiency of load transfer between the fiber and the surrounding matrix at the micro-scale level, may directly affect the overall mechanical performance of the composite at the continuum level. The region of the matrix that may be substantially affected by the presence of fibers, sometimes referred to as the "interphase" region, is the interfacial area of the matrix directly surrounding the fiber. In composites, this interphase region may experience high shear strain due to the mismatch in elastic stiffness between the fibers and the surrounding matrix.

Widely-used conventional bulk resins may not provide desirable distortional capabilities. As a result, various resin matrix formulations have been developed to improve the distortional capability of a polymer resin. However, formulations demonstrating higher distortional capability performance potential may have a higher cost than conventional bulk resins. Formulations demonstrating higher distortional capability may also have other undesirable limitations. These other undesirable limitations may include limited fluid resistance, low glass transition temperature, and less than desired prepreg handling characteristics such as insufficient tack and/or prepreg handling life. These undesirable limitations may be partially addressed by modifying the chemistry of the bulk polymer resin forming the matrix. However these modifications may require development of specialized monomers or additives which can add to product cost. Moreover, these specialized formulations and additives may undesirably reduce other performance properties of the composite. There is also a need for a method of making such composites that uses conventional bulk resins and avoids the need for resin additives or special resin formulations. Therefore, it would be desirable to have a method and apparatus that take into account at least one of the issues discussed above as well as possibly other issues.

SUMMARY

An illustrative embodiment of the present disclosure provides a fiber-reinforced resin composite comprising a polymeric resin matrix and a plurality of fibers coated with a first distortional polymeric resin. The polymeric resin matrix has a first von Mises strain. The first distortional polymeric resin has a second von Mises strain in a range of approximately 0.25 to approximately 0.45. The plurality of fibers coated with the first distortional polymeric resin are disposed in the polymeric resin matrix. The second von Mises strain is greater than the first von Mises strain.

Another embodiment of the present disclosure provides a fiber-reinforced resin composite comprising a polymeric resin matrix having a first von Mises strain, a plurality of fibers disposed in the polymeric resin matrix, and a distortional interphase region surrounding the plurality of fibers. The plurality of fibers has a second von Mises strain. A ratio of the second von Mises strain to the first von Mises strain is greater than or equal to about 1.04.

Yet another embodiment of the present disclosure provides a method of making a fiber-reinforced resin composite. The method comprises embedding a plurality of fibers coated with a first distortional polymeric resin in a polymeric resin matrix. A first von Mises strain of the first distortional polymeric resin in a cured state is in a range of approximately 0.25 to approximately 0.45. A second von Mises strain of the polymeric resin matrix is less than the first von Mises strain.

The features, functions, and advantages can be achieved independently in various illustrative examples of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and advantages thereof, will best be understood by reference to the following detailed description of an illustrative embodiment of the present disclosure when read in conjunction with the accompanying drawings, wherein:

FIG. 15 is an illustration of a graph of stress vs. strain behavior for tensile coupons in accordance with an illustrative embodiment.

DETAILED DESCRIPTION

Figure 1:
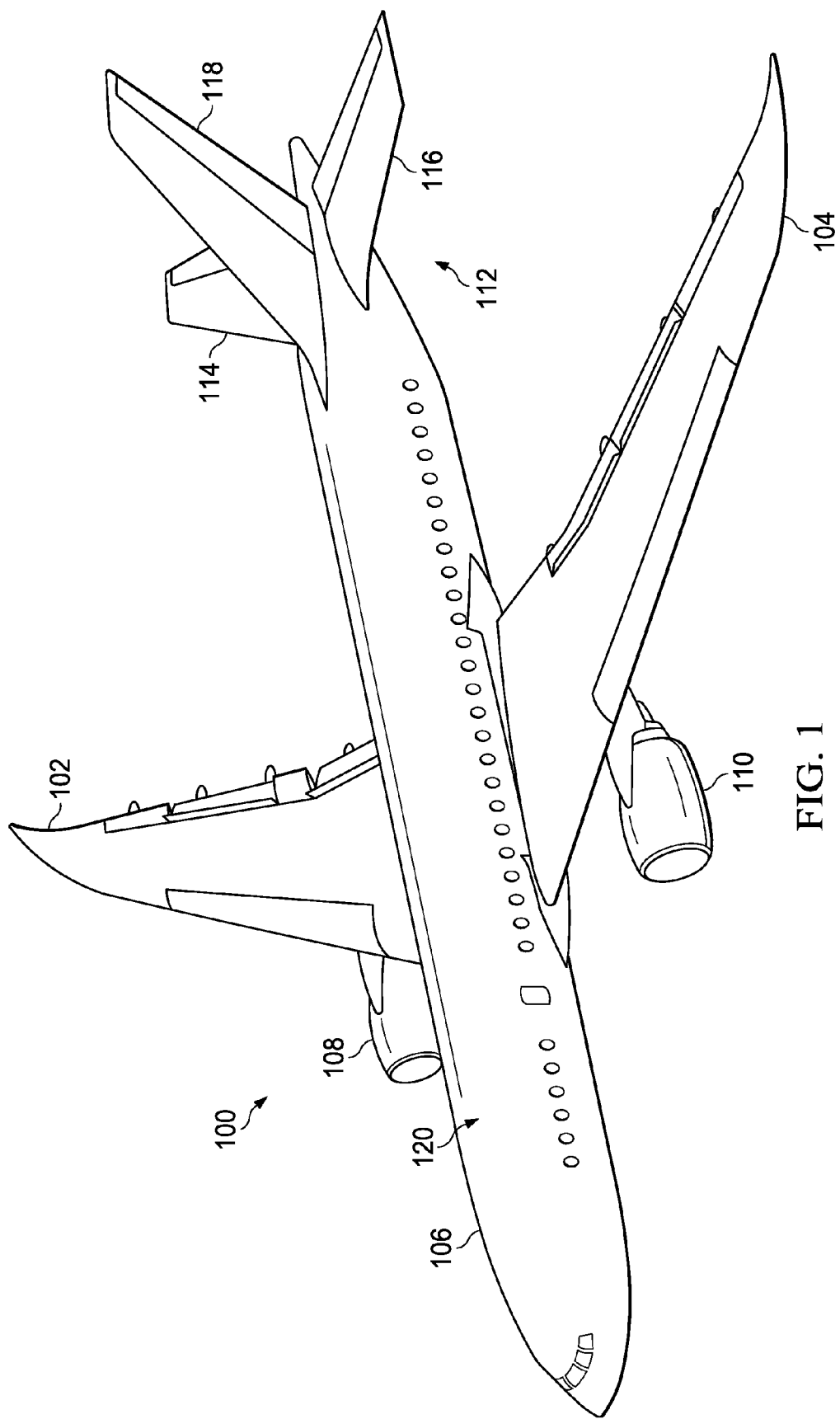
FIG. 1 is an illustration of an aircraft in accordance with an illustrative embodiment.

The different illustrative embodiments recognize and take into account a number of different considerations. For example, the different illustrative embodiments recognize and take into account that distortional polymeric resins may improve mechanical load-bearing capability of fibers in composite materials such as carbon fiber laminates. As used herein, a "distortional polymeric resin" refers to a polymeric resin having a von Mises strain of greater than or equal to approximately 0.25. In some illustrative examples, the "distortional polymeric resin" may have a von Mises strain in a range of approximately 0.25 to approximately 0.45. The inventors have found by experimental testing that as much as an 80% improvement in tensile strength properties of carbon fiber laminates can be achieved when fabricated with a distortional polymeric resin in comparison to the same carbon fiber utilized in laminates with current conventional polymeric resins.

However, the different illustrative embodiments also recognize and take into account that fiber-reinforced resin composites having a polymeric resin matrix primarily comprising distortional polymers may have undesirable properties compared to fiber-reinforced resin composites utilizing conventional bulk resins for the polymeric resin matrix. For example, the different illustrative embodiments recognize and take into account that fiber-reinforced resin composites utilizing a polymeric resin matrix primarily comprising distortional polymers may have at least one of an undesirable modulus of elasticity, glass transition temperature, fluid resistance or tack life compared to a fiber-reinforced resin composite utilizing conventional bulk resins for the polymeric resin matrix.

The different illustrative embodiments further recognize and take into account that distortional polymeric resins may be more expensive than conventional bulk resins. For example, monomers utilized in distortional polymeric resin formulations may be higher in cost due to their unique "built-in" molecular features. As another example, monomers utilized in distortional polymeric resins may be available in lower volumes than monomers used in conventional bulk resins. Monomers used in conventional bulk resins may be commodity compounds commercially available from industrial-scale manufacturers.

The different illustrative embodiments also recognize and take into account that fiber-reinforced resin composites using both a distortional polymeric resin and a conventional bulk resin may result in desirable characteristics. Specifically, desirable material performance may result from using both a distortional polymeric resin and a conventional bulk resin. Further, using both a distortional polymeric resin and a conventional bulk resin may have lower manufacturing costs than fiber-reinforced composites using only distortional polymeric resins. Further, desirable characteristics may result from surrounding a distortional polymeric resin with a conventional bulk resin present in higher volumes as the polymeric resin matrix.

The illustrative embodiments also recognize and take into account that fiber-reinforced resin composites comprising fibers coated with a distortional polymeric resin embedded in a conventional bulk resin may desirably possess distortional deformation characteristics of the distortional polymeric resin. Further, fiber-reinforced resin composites comprising fibers coated with a distortional polymeric resin embedded in a conventional bulk resin may have desirable load-bearing capability, such as tensile strength. The illustrative embodiments further recognize and take into account that fiber-reinforced resin composites comprising fibers coated with a distortional polymeric resin embedded in a conventional bulk resin may have one or more desirable properties of the bulk polymeric resin matrix.

With reference now to the figures, and in particular, with reference to FIG. 1, an illustration of an aircraft is depicted in accordance with an illustrative embodiment. In this illustrative example, aircraft 100 has wing 102 and wing 104 attached to body 106. Aircraft 100 includes engine 108 attached to wing 102 and engine 110 attached to wing 104.

Body 106 has tail section 112. Horizontal stabilizer 114, horizontal stabilizer 116, and vertical stabilizer 118 are attached to tail section 112 of body 106.

Aircraft 100 is an example in which various illustrative embodiments of the fiber-reinforced resin composites disclosed herein may be implemented. Fiber-reinforced resin composites having fibers coated with a distortional polymeric resin disclosed herein may, for example, be used as a material for components of aircraft 100 where a lightweight reinforced composite material may be of benefit. As another example, fiber-reinforced resin composites having fibers coated with a distortional polymeric resin may be used as a material in spars (not shown) of wing 104. As yet another example, composite skin 120 of body 106 or wing 104 may comprise fiber-reinforced resin composite having fibers coated with a distortional polymeric resin.

The illustration of aircraft 100 in FIG. 1 is not meant to imply physical or architectural limitations to the manner in which an illustrative embodiment may be implemented. For example, although aircraft 100 is a commercial aircraft, aircraft 100 may be a military aircraft, a rotorcraft, a helicopter, an unmanned aerial vehicle, or any other suitable aerospace structure.

Although the illustrative examples for an illustrative embodiment are described with respect to an aircraft or other aerospace structure, the illustrative embodiment may be applied to other types of platforms. The platform may be, for example, a mobile platform, a stationary platform, a land-based structure, an aquatic-based structure, and a space-based structure. More specifically, the platform, may be a surface ship, a tank, a personnel carrier, a train, a spacecraft, a space station, a satellite, a submarine, an automobile, a power plant, a bridge, a dam, a house, a windmill, a manufacturing facility, a building, and other suitable platforms.

Figure 2:
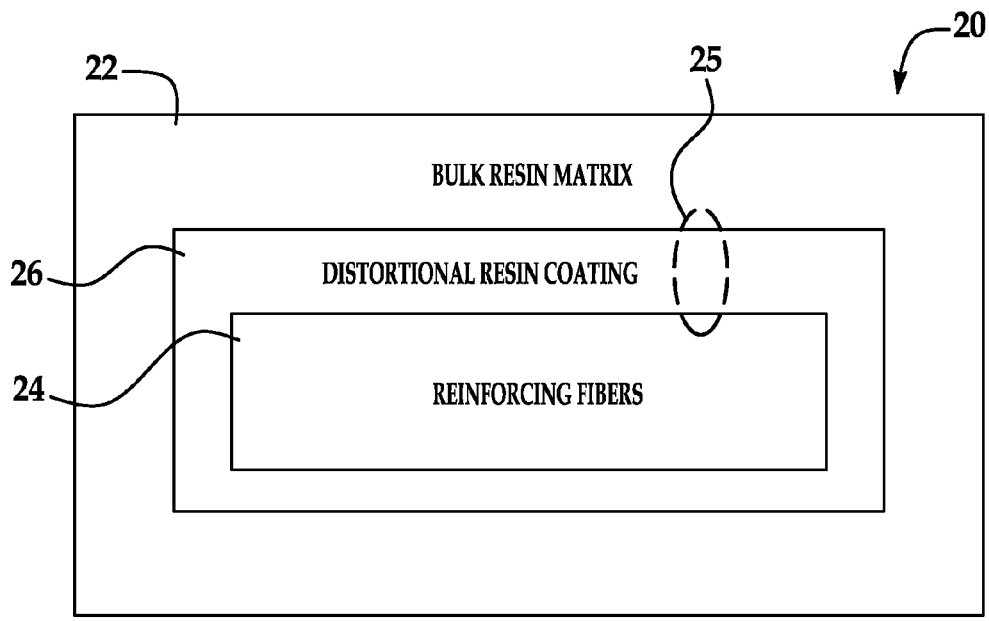
FIG. 2 is an illustration of a functional block diagram of a composite employing distortional resin coated fibers in accordance with an illustrative embodiment.

Referring to FIG. 2, a block diagram of a composite 20 is depicted in accordance with an illustrative embodiment. Composite 20 comprises fibers 24 embedded in a polymeric resin matrix 22. Fibers 24 may be reinforcing fibers. Fibers 24 may be continuous or discontinuous (e.g. chopped fibers) and may be formed from any of a variety of materials, including but not limited to carbon, glass, organics, metallic, ceramic and others. In various illustrative examples, fibers 24 have a distortional resin coating 26 thereon having a relatively high distortional deformation capability compared to the distortional deformation capability of surrounding polymeric resin matrix 22. Polymeric resin matrix 22 may comprise a conventional bulk resin. Distortional resin coating 26 may result in significant improvements in mechanical performance of composite 20, such as increased ultimate strength and/or strain as well as potential improvements in delamination and micro-crack resistance. As used herein, the phrase "and/or" shall be construed as an "inclusive" or, and not an "exclusive" or. For example, used herein the phrase "A and/or B" would mean "A, B, or A and B." As another example, the phrase "A, B, and/or C," as used herein, would mean "A, B, C, or any combination thereof."

The distortional deformation capability of distortional resin coating 26, which may be expressed in terms of von Mises strain performance, is high relative to polymeric resin matrix 22 in order to achieve optimum fiber-resin load transfer capability between fibers 24 and surrounding polymeric resin matrix 22. The von Mises strain or stress is an index derived from combinations of principle stresses at any given point in a material to determine at which point in the material, stress will cause failure. Polymeric resin matrix 22 may have a distortional capability lower than that of fibers 24, exhibited by a lower von Mises strain performance. Nevertheless, composite 20 may exhibit greater overall mechanical performance than a composite fabricated without distortional resin coating 26 having fibers 24 and polymeric resin matrix 22.

Distortional resin coating 26 may be a polymeric distortional resin coating. Examples of materials suitable for distortional resin coating 26 include, but are not limited to, the compositions described in U.S. Pat. No. 7,745,549, the entire disclosure of which patent is incorporated by reference herein. The compositions disclosed in U.S. Pat. No. 7,745, 549 exhibit increased distortional deformation, and/or decreased dilatation load, as expressed within the von Mises strain relationship. As discussed in U.S. Pat. No. 7,745,549, fiber performance may be limited by low matrix-critical distortional capability of the thermoset resins used in known composites. The composite polymer matrixes of U.S. Pat. No. 7,745,549 exhibits improved (i.e. increased) distortional deformation and/or decreased (i.e. lower) dilatation load, increasing von Mises strain and providing enhanced composite mechanical performance.

It is hypothesized that that a polymeric resin with improved distortional capability is able to transfer load around microscale flaws in the fiber, which can be considered failure initiation sites in the fiber, along the longitudinal axis of the fiber when the fiber experiences a load. This ability to redistribute the load around the flaws may allow the fiber to continue to sustain load without failure. The molecular basis for a polymer matrix's ability to undergo a distortional response to an applied force is theorized as being due to a cooperative motion of a specific volume or segment of the polymer chain. Therefore, molecular structures which are able to conform ally adjust with applied force will enhance the polymer's ability to undergo and increase its distortional response.

In various illustrative examples, composite 20 may comprise a distortional interphase region 25 comprising a distortional resin disposed between fibers 24 and polymeric resin matrix 22. Distortional interphase region 25 may define all or part of a region in composite 20 that experiences high shear strain upon application of an applied force to composite 20. Not wishing to be bound by theory, it is believed that such high shear strain may be due to a mismatch between an elastic stiffness of fibers 24 and an elastic stiffness of polymeric resin matrix 22. Again, not without wishing to be bound by theory, it is believed that a distinct distortional interphase region 25 surrounding each of fibers 24 and comprising distortional resin coating 26 may improve the overall mechanical performance of composite 20 by providing a distortional response to the application of an applied force to composite 20. A distortional response may also be referred to as a deviatoric response and is a change in shape. Without wishing to be bound by theory, it is believed that the distortional or deviatoric response of polymeric resin matrix 22 to an applied force may be viewed as an abrupt shear transformation or cooperative motion of a specific volume or segment of the polymer chain responding to a strain bias.

Figure 3:
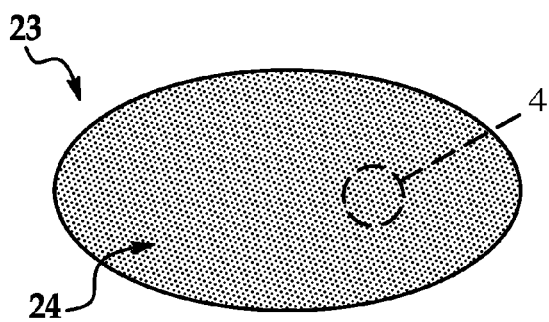
FIG. 3 is an illustration of a sectional view of a fiber tow of distortional resin coated filaments in accordance with an illustrative embodiment.
Figure 4:
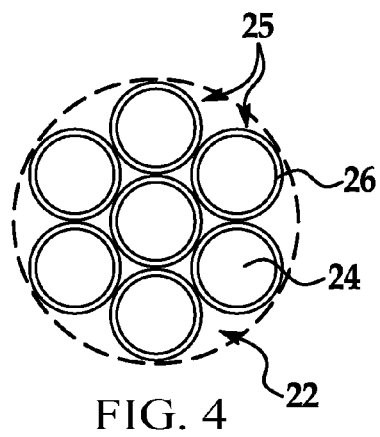
FIG. 4 is a more detailed illustration of a fiber tow of distortional resin coated filaments in accordance with an illustrative embodiment.

Referring to FIG. 3, an illustration of a sectional view of an individual fiber tow 23 is depicted in accordance with an illustrative example. An individual fiber tow 23 is pre-impregnated with a bulk matrix resin and comprises a multiplicity of individual filaments or fibers 24 each having a distortional resin coating 26 surrounded by bulk matrix resin. Bulk matrix resin may comprise any of a variety of polymeric resins used in high performance structural composites. Curing may transform bulk matrix resin into polymeric resin matrix 22 and embed coated fibers 24 in the polymeric resin matrix 22 as described above in FIG. 2.

Figure 5:
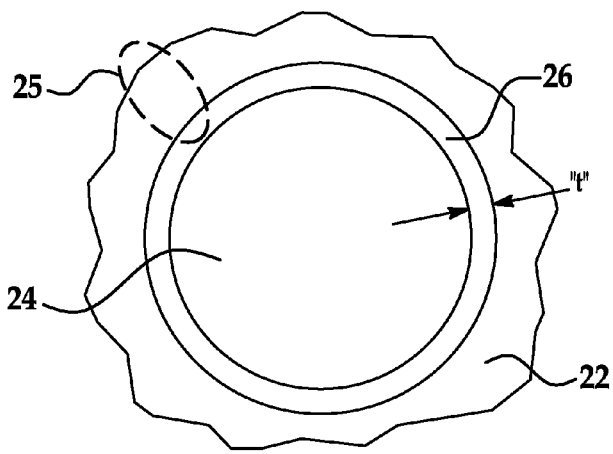
FIG. 5 is a more detailed illustration of a cross sectional view of an individual distortional resin coated filament in accordance with an illustrative embodiment.

Distortional resin coating 26 may be applied to fibers 24 using any of various conventional techniques, including but not limited to dipping and spraying. The thickness "t" (FIG. 5) of distortional resin coating 26 will depend upon the particular application and performance requirements of composite 20.

As previously discussed, in fiber-reinforced composites, the efficiency of load transfer between reinforcing fibers 24 and surrounding polymeric resin matrix 22 at the microscale level may substantially affect the overall mechanical performance of composite 20. The critical region of composite 20 affected by the presence of fibers 24, is distortional interphase region 25. Without wishing to be bound by theory, it is believed that this distortional interphase region 25 experiences relatively high shear strain due to the mismatch between the relatively high elastic stiffness of fibers 24 and the relatively low elastic stiffness of surrounding polymeric resin matrix 22.

Bulk matrix resin forming polymeric resin matrix 22 may be any suitable commercial or custom resin system having the desired physical properties which are different from those of distortional resin coating 26. These differences in physical properties result in distortional resin coating 26 having a higher distortional capability than that of polymeric resin matrix 22. For example and without limitation, typical physical properties of the bulk matrix resin used in polymeric resin matrix 22 which may affect its distortional capability include but are not limited to: superior fluid resistance, increased modulus, increased high temperature performance, improved process ability and/or handling properties (such as the degree of tack and tack life) relative to distortional resin coating 26.

In various illustrative examples, composite 20 may be produced from a prepreg. In such illustrative examples, distortional resin coating 26 may be applied to fibers 24 prior to impregnation of fibers 24 with bulk matrix resin. By impregnating fibers 24 after distortional resin coating 26 is applied, a variety of processes may be used to coat fibers 24. After impregnating fibers 24, the resulting impregnated fibers 24 may be cured. Curing may transform bulk matrix resin into polymeric resin matrix 22 and embed coated fibers 24 in the polymeric resin matrix 22. In thus-formed composite 20, polymeric resin matrix 22 surrounds coated fibers 24 embedded in polymeric resin matrix 22.

In other illustrative examples, composite 20 may be produced from a fiber preform (not shown) coated with a distortional resin and infused with a bulk matrix material. In one such illustrative example, fibers of a fiber preform may be coated with distortional resin before being formed into the fiber preform. In another such illustrative example, a fiber preform may be formed from fibers 24 and then coated with a distortional resin such that fibers 24 have distortional resin coating 26. The fiber preform coated with the distortional resin may then be infused with bulk matrix resin such that fibers 24 coated with distortional resin coating 26 are impregnated with bulk matrix resin. After impregnation, the fiber preform coated with the distortional resin and infused with bulk matrix resin may then be cured. During curing of the fiber preform coated with the distortional resin and infused with bulk matrix resin, polymeric resin matrix 22 forms from bulk matrix resin and fibers 24 having distortional resin coating 26 become embedded in polymeric resin matrix 22.

Figure 6:
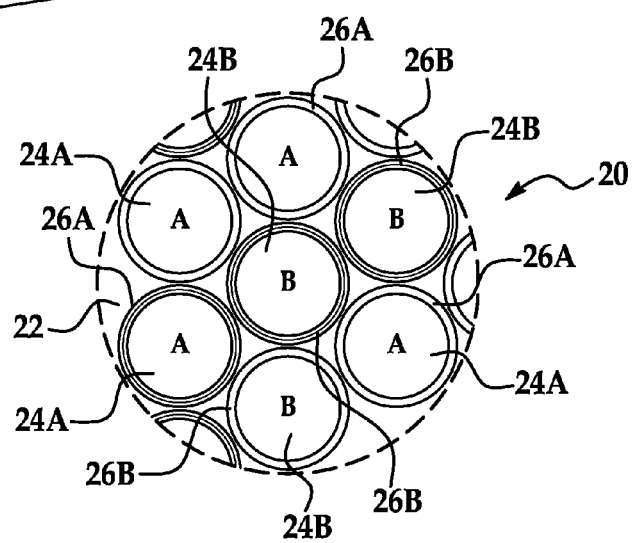
FIG. 6 is an illustration showing the use of a two types of reinforcing fibers having differing moduli or strength and distortional resin coatings in accordance with an illustrative embodiment.

FIG. 6 illustrates a composite 20 having two groups of fibers 24a, 24b respectively having high and low moduli. Composites 20 having fibers 24a, 24b with different moduli are sometimes referred to as hybrid composites. In some illustrative examples, differing distortional resin coatings 26a, 26b may be respectively applied to groups of fibers 24a, 24b having differing physical characteristics.

Figure 7:
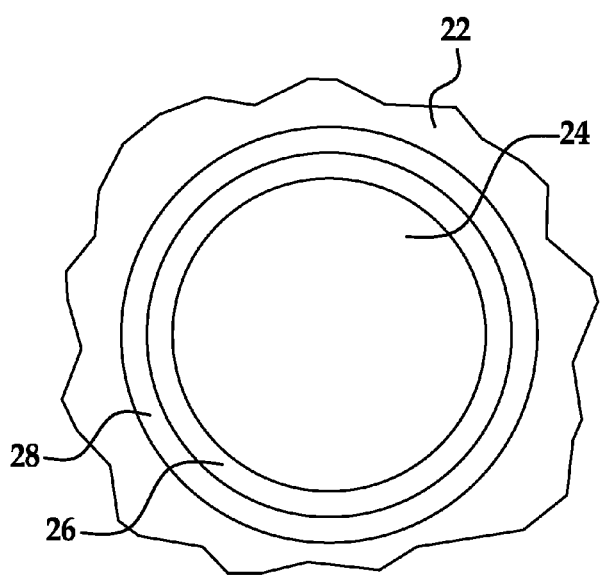
FIG. 7 is an illustration of a cross sectional view of a fiber having multiple distortional resin coatings in accordance with an illustrative embodiment.

Referring to FIG. 7, it may be desirable in some applications to apply multiple distortional resin coatings 26, 28 of distortional resins over fibers 24. Multiple distortional resin coatings 26, 28 may have differing distortional deformation capabilities to form a transitional region that increases the load transfer ability between fibers 24 and the surrounding bulk resin forming polymeric resin matrix 22. In this example, the distortional deformation capability of outer distortional resin coating 28 may be greater than that of inner distortional resin coating 26.

Figure 8:
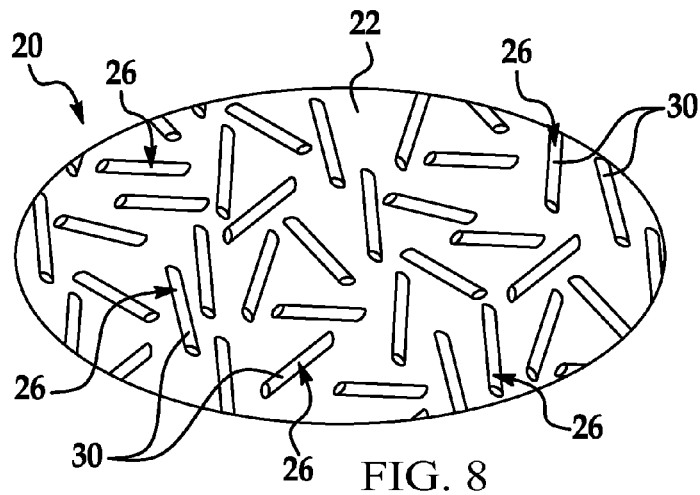
FIG. 8 is an illustration of a sectional view of a composite having discontinuous reinforcing fibers coated with a distortional resin in accordance with an illustrative embodiment.

FIG. 8 illustrates a composite 20 comprising a polymeric resin matrix 22 that is reinforced with discontinuous fibers 30, sometimes referred to as chopped fibers, each of which has a distortional resin coating 26.

Figure 9:
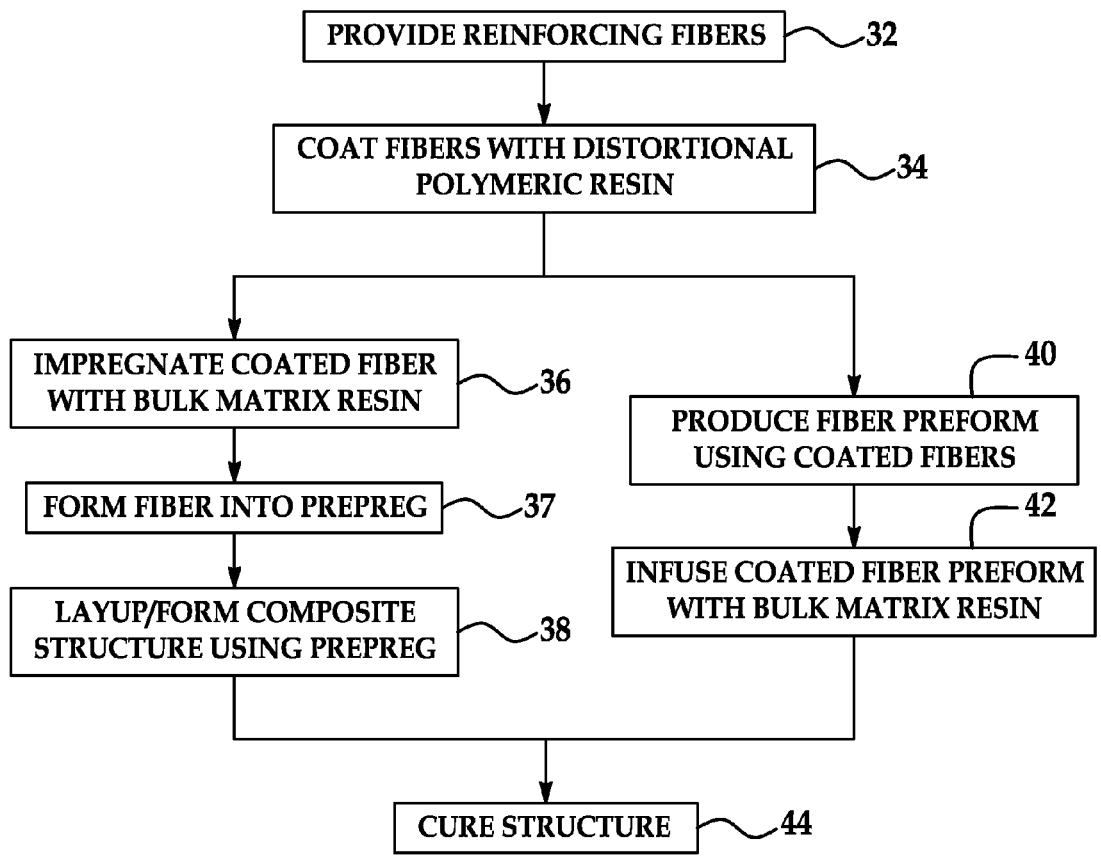
FIG. 9 is an illustration of a flow diagram of a method of fabricating a composite structure using distortional resin coated fibers in accordance with an illustrative embodiment.

Attention is now directed to FIG. 9 which broadly illustrates the steps of a method of manufacturing a composite structure (not shown) using composite 20 previously described. Beginning at 32, fibers 24 suitable for the application are provided which, as previously mentioned, may be continuous or discontinuous. At 34, fibers 24 are coated with a distortional polymeric resin having a distortional capability that is greater than that of the polymeric resin forming polymeric resin matrix 22.

In one illustrative example, at step 36, the fibers 24 are impregnated with the bulk matrix resin, and at step 37 the impregnated, coated fibers 24 are formed into to a prepreg which may comprise prepreg tows, prepreg tape or a prepreg fabric. At 38, a composite structure is laid up and formed using the prepreg. In another illustrative example, as shown in step 40, the distortional resin coated fibers 24 are used to produce a dry or substantially dry fiber preform which, at step 42, is infused with a bulk matrix resin using, for example, a vacuum assisted resin transfer molding process. Finally, at 44, the structure is cured. During curing, distortional resin coated fibers 24 are embedded in surrounding polymeric resin matrix 22, resulting in the previously described distortional interphase region 25 between fibers 24 and polymeric resin matrix 22.

In some applications, it may be necessary to control migration of distortional resin coating 26 during the curing process. One solution to this problem involves formulating distortional resin coating 26 to have a viscosity that is higher than that of the bulk resin forming polymeric resin matrix 22. During curing, distortional resin coating 26 is retained on the fibers' surface due to its higher viscosity and lessened ability to flow. Another solution to the problem consists of exposing the distortional resin coated fibers 24 to an appropriate elevated temperature after fibers 24 are coated in order to slightly cross link (cure) the distortional resin, thereby increasing its viscosity and its adherence to fibers 24.

In one illustrative example, a method is provided of making a fiber-reinforced polymer resin, comprising coating reinforcing fibers with a first polymeric resin to form coated fibers, and embedding the coated fibers in a second polymeric resin. A distortional deformation capability of the first polymeric resin is greater than a distortional deformation capability of the second polymeric resin, and the first polymeric resin may be any of various resin chemistries exhibiting a high distortional deformation capability. The first polymeric resin may be an epoxy exhibiting a high distortional deformation capability. The fibers may have a modulus of elasticity higher than a modulus of elasticity of the first polymeric resin. The method further comprises selecting the fibers from the group consisting of carbon fibers, glass fibers, organic fibers, metallic fibers and ceramic fibers. The method may include applying a coating of a third polymeric resin over the coating of the first polymeric resin, wherein the third polymeric resin has a distortional deformation capability greater than the distortional deformation capability of the second polymeric resin and less than the distortional deformation capability of the first polymeric resin.

According to another illustrative example, a method is provided for making a fiber-reinforced polymer composite, comprising providing a bulk matrix resin and providing fibers for reinforcing a polymeric resin matrix formed from the bulk matrix resin. The method further comprises embedding the fibers in a polymeric resin matrix. Embedding the fibers in the matrix may include impregnating the fibers with the bulk matrix resin. Embedding the fibers may include curing the bulk matrix resin, wherein curing the bulk matrix resin forms a polymeric resin matrix. The method may further comprise forming a distortional interphase region between the fibers and the polymeric resin matrix, wherein the distortional interphase region improves load transfer between the fibers and the polymeric resin matrix. Forming the distortional interphase region includes coating the fibers with a polymeric distortional resin having at least one property different from the polymeric resin matrix. The at least one property is selected from the group consisting of fluid resistance, increased modulus, high temperature performance, processability, and handling properties. Providing fibers includes selecting the fibers from the group consisting of carbon fibers, organic fibers, metallic fibers and ceramic fibers. Providing fibers for reinforcing the polymeric resin matrix includes providing two groups of fibers respectively having different moduli, and forming the distortional interphase region between the fibers and the polymeric resin matrix includes coating the fibers in each of the groups with differing polymeric resins each having a distortional deformation capability higher than a distortional deformation capability of the polymeric resin matrix.

Figure 10:
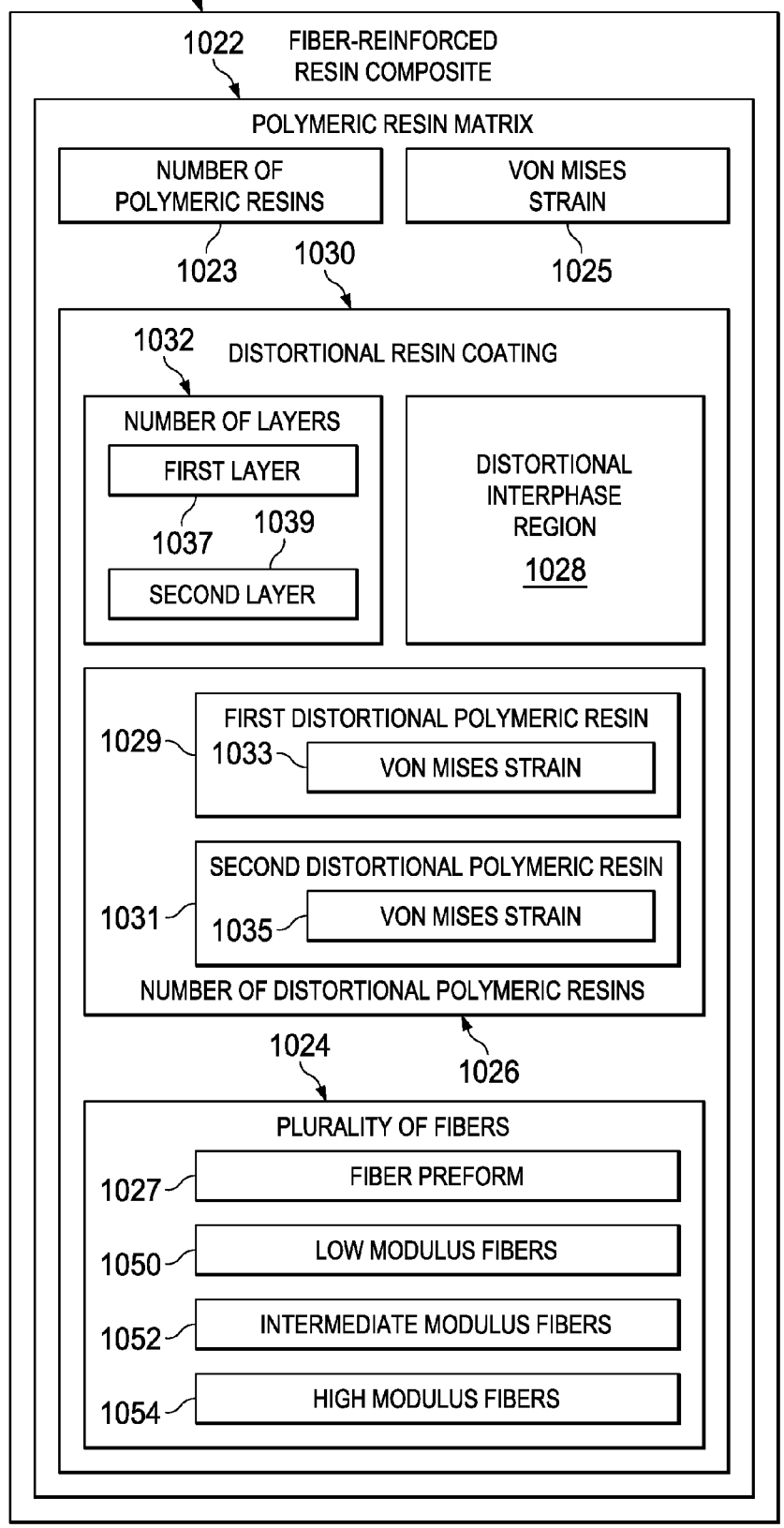
FIG. 10 is an illustration of a block diagram of a fiber-reinforced resin composite in accordance with an illustrative embodiment.

Referring to FIG. 10, a block diagram of a fiber-reinforced resin composite is depicted in accordance with an illustrative example. Fiber-reinforced resin composite 1020 comprises polymeric resin matrix 1022, plurality of fibers 1024, and distortional resin coating 1030. Specifically, fiber-reinforced resin composite 1020 comprises plurality of fibers 1024 coated with distortional resin coating 1030 embedded in polymeric resin matrix 1022.

Polymeric resin matrix 1022 may comprise number of polymeric matrix resins 1023. As used herein, "a number of", when used with reference to items, means one or more items. Number of polymeric matrix resins 1023 may include any polymeric resins capable of functioning as a matrix material of a fiber-reinforced composite. Number of polymeric matrix resins 1023 may be conventional bulk resins. Number of polymeric matrix resins 1023 may also be referred to as an uncured resinous matrix material or uncured resinous matrix materials. Number of polymeric matrix resins 1023 may include, but are not limited to, thermoset polymeric resins. Thermoset polymeric resins may include, for example, at least one of epoxy resins, phenolic and amino resins, polyimide resins, polyamide resins, polyurethane resins, or other suitable thermoset polymeric resins.

As used herein, the phrase "at least one of," when used with a list of items, means different combinations of one or more of the listed items may be used and only one of each item in the list may be needed. In other words, at least one of means any combination of items and number of items may be used from the list but not all of the items in the list are required. The item may be a particular object, thing, or a category. For example, "at least one of item A, item B, or item C" may include, without limitation, item A, item A and item B, or item B. This example also may include item A, item B, and item C or item B and item C. Of course, any combinations of these items may be present. In other examples, "at least one of" may be, for example, without limitation, two of item A; one of item B; and ten of item C; four of item B and seven of item C; or other suitable combinations.

In some illustrative examples, polymeric resin matrix 1022 comprises at least one epoxy resin. In one such illustrative example, polymeric resin matrix 1022 may comprise at least one of a bisphenol A epoxy resin or a bisphenol F epoxy resin.

In some illustrative examples, number of polymeric matrix resins 1023 for polymeric resin matrix 1022 may include, but are not limited to, modified polymeric resins. Examples of suitable modified polymeric matrix resins include, but are not limited to, epoxy resins cured or partially cured in the presence of a curing agent, such as an amine curing agent. In an illustrative example, polymeric resin matrix 1022 comprises a modified epoxy resin including at least one of a bisphenol A epoxy resin or a bisphenol F epoxy resin and diaminodiphenylsulfone monomers.

In some illustrative examples, polymeric resin matrix 1022 may comprise one or more commercially available polymeric matrix resins. In some illustrative examples, polymeric resin matrix 1022 comprises one or more commercially available formulations of the thermoset polymers described above. In some illustrative examples, polymeric resin matrix 1022 comprises one or more commercially available epoxy resins. Commercially available epoxy matrix resins suitable for use in various illustrative examples may be obtained from, for example, Cytec Industries of Woodland Park, N.J. under the tradename CYCOM (e.g., Cycom 977-3 epoxy resin system and Cycom 970 epoxy resin); Hexcel Corporation of Stamford, Conn. under the tradename HEXPLY (e.g., HexPly 3501-6 epoxy matrix, HexPly 8552 epoxy matrix, and HexPly M21); and Toray Industries (America), Inc. of New York, N.Y. (e.g., 3900-2 resin).

In various illustrative examples, polymeric resin matrix 1022 has von Mises strain 1025 of less than approximately 0.25. In some illustrative examples, polymeric resin matrix 1022 may have von Mises strain 1025 in a range of from approximately 0.18 to approximately 0.24.

Plurality of fibers 1024 may comprise one or more different types of fibers. Plurality of fibers 1024 may include any fibers capable of reinforcing a resinous composite. Plurality of fibers 1024 may include, for example, at least one of carbon fibers, glass fibers, organic fibers, metallic fibers, ceramic fibers, or other suitable fibers. In some illustrative examples, the fibers may include organic fibers selected from at least one of aramid fibers (e.g., Kevlar, Twaron, etc.), high molecular weight polyethylene (HMWPE) fibers, ultra high molecular weight polyethylene (UHMWPE) fibers, nylon fibers, or any other suitable organic fibers.

Plurality of fibers 1024 may comprise at least one of low modulus fibers 1050, intermediate modulus fibers 1052, or high modulus fibers 1054. As used herein, low modulus fibers 1050 may also be referred to as fibers having a low modulus of elasticity. Low modulus fibers 1050 are fibers having a modulus of elasticity in the range of from approximately 20 million pounds per square inch (msi) to approximately 40 msi. In some illustrative examples, low modulus fibers 1050 may have a modulus of elasticity in a range of from approximately 33 msi to approximately 36 msi.

As used herein, intermediate modulus fibers 1052 may also be referred to as fibers having an intermediate modulus of elasticity. Intermediate modulus fibers 1052 are fibers having a modulus of elasticity in a range of from approximately 40 msi to approximately 45 msi.

As used herein, high modulus fibers 1054 may also be referred to as fibers having a high modulus of elasticity. High modulus fibers 1054 are fibers having a modulus of elasticity of greater than approximately 45 msi.

However, these ranges are not intended to limit the fibers that may be used in fiber-reinforced resin composite 1020. Plurality of fibers 1024 may comprise fibers having moduli of elasticity outside of these ranges, alone or in combination with fibers having low, intermediate, and/or high moduli of elasticity.

In various illustrative examples, plurality of fibers 1024 comprises at least one of low modulus fibers 1050, intermediate modulus fibers 1052, or high modulus fibers 1054. In some illustrative examples, plurality of fibers 1024 of fiber-reinforced resin composite 1020 comprises low modulus fibers 1050 and high modulus fibers 1054. In other illustrative examples, plurality of fibers 1024 of fiber-reinforced resin composite 1020 comprises intermediate modulus fibers 1052 and high modulus fibers 1054. In still other illustrative examples, plurality of fibers 1024 of fiber-reinforced resin composite 1020 comprises low modulus fibers 1050 and intermediate modulus fibers 1052.

In various illustrative examples, plurality of fibers 1024 comprises carbon fibers. Commercially available carbon fibers suitable for use in various illustrative examples of the disclosure may be obtained from, for example, Toray Carbon Fibers America, Inc. of Decatur, Ala. under the tradename TORAYCA; Hexcel Corporation of Stamford, Conn. under the tradename HEXTOW. Examples of carbon fibers commercially available from Toray Industries having moduli of elasticity in the low, intermediate, and high ranges are shown in Table II below.

TABLE 1

Commercially Available Fibers Having Low, Intermediate, and High Modulus of Elasticity

| Range | Carbon Fiber Product* | Modulus of Elasticity |
|---|---|---|
| Low Modulus | TORAYCA T300 | 33 msi |
|  | TORAYCA T700S | 33 msi |
| Intermediate Modulus | TORAYCA T800S | 43 msi |
| High Modulus | TORAYCA M35J | 50 msi |
|  | TORAYCA M40J | 55 msi |
|  | TORAYCA M46J | 63 msi |
|  | TORAYCA M50J | 69 msi |
|  | TORAYCA M55J | 78 msi |
|  | TORAYCA M60J | 85 msi |

*As formulated on Nov. 10, 2013.

In some illustrative examples, plurality of fibers 1024 may take the form of fiber preform 1027. Fiber preform 1027 comprises plurality of fibers 1024 formed into a shape. In some illustrative examples, fiber preform 1027 may take the form of a sheet. Fiber preform 1027 may have a desirable shape for fiber-reinforced resin composite 1020.

Distortional resin coating 1030 coats plurality of fibers 1024. Distortional resin coating 1030 may also form distortional interphase region 1028 between plurality of fibers 1024 and polymeric resin matrix 1022. Distortional resin coating 1030 may be formed of number of distortional polymeric resins 1026.

In some illustrative examples, number of distortional polymeric resins 1026 may be a single polymeric resin. In other illustrative examples, number of distortional polymeric resins 1026 may be a combination of two or more polymeric resins. In some illustrative examples, number of distortional polymeric resins 1026 may be formed from a blend of polymeric resins. Number of distortional polymeric resins 1026 has a first von Mises strain of greater than or equal to approximately 0.25. In some illustrative examples, number of distortional polymeric resins 1026 has a first von Mises strain in a range of approximately 0.25 to approximately 0.45. As depicted, number of distortional polymeric resins 1026 may include first distortional polymeric resin 1029 and second distortional polymeric resin 1031. First distortional polymeric resin 1029 has von Mises strain 1033. Second distortional polymeric resin 1031 has von Mises strain 1035.

In some illustrative examples, von Mises strain 1033 is greater than or equal to approximately 0.30. In other illustrative examples, von Mises strain 1033 is greater than or equal to approximately 0.40. In yet other illustrative examples, von Mises strain 1033 is in a range of from approximately 0.25 to approximately 0.30. In still further illustrative examples, von Mises strain 1033 is in a range of from approximately 0.30 to approximately 0.39.

In some illustrative examples, von Mises strain 1035 is greater than or equal to approximately 0.30. In other illustrative examples, von Mises strain 1035 is greater than or equal to approximately 0.40. In yet other illustrative examples, von Mises strain 1035 is in a range of from approximately 0.25 to approximately 0.30. In still further illustrative examples, von Mises strain 1035 is in a range of from approximately 0.30 to approximately 0.39.

The von Mises strain of a material can be calculated according to equation 1:

$$\varepsilon_{vM} = \left\{ \frac{1}{2} [(\varepsilon_1 - \varepsilon_2)^2 + (\varepsilon_2 - \varepsilon_3)^2 + (\varepsilon_1 - \varepsilon_3)^2] \right\}^{\frac{1}{2}} \quad (1)$$

where $\varepsilon_{vM}$ represents the von Mises strain, and $\varepsilon_1$, $\varepsilon_2$, and $\varepsilon_3$ are the principal strains in the three principal planes. Values of $\varepsilon_1$, $\varepsilon_2$, and $\varepsilon_3$ for a particular material (e.g., the distortional polymeric resins described herein) may be determined experimentally, for example, via a mechanics of materials analysis. Values of $\varepsilon_1$, $\varepsilon_2$, and $\varepsilon_3$ for a particular material (e.g., the distortional polymeric resins described herein) may also be predicted, for example, via a finite element analysis (FEA) method.

In some illustrative examples, number of distortional polymeric resins 1026 may comprise a number of distortional epoxy resins. As used herein, a "distortional epoxy resin" refers to an epoxy resin having a von Mises strain greater than or equal to about 0.25. In some illustrative examples, a "distortional epoxy resin" has a von Mises strain in a range of approximately 0.25 to approximately 0.45. In an illustrative example, number of distortional polymeric resins 1026 comprises phenyl-isopropyl-phenyl-isopropyl-phenyl epoxy resin. In an illustrative example, number of distortional polymeric resins 1026 comprises a phenyl-methyl substituted methyline-phenyl epoxy resin.

In some illustrative examples, number of distortional polymeric resins 1026 comprises at least one epoxy resin and at least one amine, such as a diamine. The epoxy resins may include, for example, at least one of bisphenol F based tri-functional novolac epoxy resin, diglycidyl α,α'-bis(4-hydroxyphenyl)-p-diisopropylbenzene, diglycidyl ether of bisphenol-A, or any other suitable epoxy resin. The amines may include, for example, at least one of 4,4' bis(3-aminophenoxy) diphenylsulfone, 3,3' diamino diphenylsulfone, 1,3 bis(3-aminophenoxy) benzene, 1,3 bis(4-aminophenoxy)-2,2 dimethylpropane, 1,3 bis(3-aminophenoxy)-2,2 dimethylpropane, or other suitable amines. In such illustrative examples, the amount of the amine component may be in a range of from approximately 24 percent by weight (wt %) to about 65 wt % based on the total weight of number of distortional polymeric resins 1026. In some illustrative examples, the amount of the amine may be greater than or equal to approximately 30 wt % based on the total weight of number of distortional polymeric resins 1026. In some illustrative examples, the amount of the amine may be in a range of from approximately 30 wt % to approximately 65 wt % based on the total weight of number of distortional polymeric resins 1026.

In some illustrative examples, number of distortional polymeric resins 1026 has a von Mises strain of greater than or equal to approximately 0.30 and comprises at least one of bisphenol F based tri-functional novolac epoxy resin and 4,4' bis(3-aminophenoxy) diphenylsulfone; bisphenol F based tri-functional novolac epoxy resin and 3,3' diamino diphenylsulfone; bisphenol F based tri-functional novolac epoxy resin and 1,3 bis(3-aminophenoxy) benzene; diglycidyl α,α'-bis (4-hydroxyphenyl)-p-diisopropylbenzene and 4,4' bis(3-aminophenoxy) diphenylsulfone; diglycidyl ether of bisphenol-A and 1,3 bis(4-aminophenoxy)-2,2 dimethylpropane; diglycidyl ether of bisphenol-A and 3,3' diaminodiphenylsulfone; or diglycidyl ether of bisphenol-A and 1,3 bis(3-aminophenoxy)-2,2 dimethylpropane. In an illustrative example, distortional resin coating 1030 comprises diglycidyl α,α'-bis (4-hydroxyphenyl)-p-diisopropylbenzene and 4,4' bis(3-aminophenoxy)diphenylsulfone.

Number of distortional polymeric resins 1026 may comprise one or more commercially available distortional resin components. An example of a commercially available epoxy resin suitable for use as a distortional resin component in various illustrative examples herein is bisphenol F based trifunctional novolac epoxy resin, which may be obtained from Dow Chemical Company of Midland, Mich. under the tradename D.E.N. (e.g., D.E.N. 431). An example of a commercially available diamine suitable for use as a distortional resin component in various illustrative examples herein is 3,3' diaminodiphenylsulfone, which may be obtained from, for example, Showa Kako of Osaka, Japan under the tradename 3,3'-DDS.

Distortional resin coating 1030 is present in fiber-reinforced resin composite 1020 as a coating on plurality of fibers 1024. The thickness of distortional resin coating 1030 over plurality of fibers 1024 may be uniform, variable, or a combination thereof. The composition of distortional resin coating 1030 may be heterogeneous, homogenous, or a combination thereof.

Distortional resin coating 1030 comprises number of layers 1032. Each layer of number of layers 1032 may comprise one or more distortional polymeric resins of number of distortional polymeric resins 1026. In some illustrative examples, number of layers 1032 comprises a single layer of distortional polymeric resin. In other illustrative examples, number of layers 1032 comprises two or more different layers of distortional polymeric resin. In such illustrative examples, the von Mises index of the individual layers of number of layers 1032 may be the same and/or different from the other layers of number of layers 1032.

As depicted, number of layers 1032 has first layer 1037 and second layer 1039. In some illustrative examples, first layer 1037 covers plurality of fibers 1024 while second layer 1039 covers first layer 1037. In these illustrative examples, first layer 1037 comprises first distortional polymeric resin 1029 having von Mises strain 1033. In these illustrative examples, second layer 1039 comprises second distortional polymeric resin 1031 having von Mises strain 1035. In one illustrative example, von Mises strain 1035 is greater than von Mises strain 1033. In another illustrative example, von Mises strain 1035 is greater than von Mises strain 1033 and von Mises strain 1025.

In some illustrative examples, the von Mises strains of successive layers of number of layers 1032 decrease as the number of layers intervening between each individual layer and plurality of fibers 1024 increases. In one such illustrative example, number of layers 1032 includes first layer 1037 covering plurality of fibers 1024, second layer 1039 covering first layer 1037, and, optionally, a third layer covering second layer 1039. In this illustrative example, a von Mises strain of first layer 1037 is greater than a von Mises strain of second layer 1039, the von Mises strain of second layer 1039 is greater than a von Mises strain of the third layer, and the von Mises strains of the first, second, and third layers are all greater than von Mises strain 1025 of polymeric resin matrix 1022.

In some illustrative examples, fiber-reinforced resin composite 1020 comprises fiber preform 1027 coated with number of distortional polymeric resins 1026 and impregnated with polymeric resin matrix 1022. In one such illustrative example, the impregnated, coated fiber preform 1027 has been cured. In another such illustrative example, the impregnated, coated fiber preform 1027 is uncured or partially cured and has a tack life greater than a tack life of at least one distortional polymeric resin in number of distortional polymeric resins 1026.

As briefly discussed above, fiber-reinforced resin composite 1020 may comprise distortional interphase region 1028 disposed between plurality of fibers 1024 and polymeric resin matrix 1022. Distortional interphase region 1028 may define all or part of a region in fiber-reinforced resin composite 1020 that experiences high shear strain upon application of an applied force to fiber-reinforced resin composite 1020. Distortional interphase region 1028 may be formed of distortional resin coating 1030. Distortional interphase region 1028 may include at least a portion of number of distortional polymeric resins 1026 of distortional resin coating 1030. Distortional interphase region 1028 may be bonded to at least one of chemical functional groups of plurality of fibers 1024 or chemical functional groups of polymeric resin matrix 1022.

Not wishing to be bound by theory, it is believed that the high shear strain in distortional interphase region 1028 may be due to a mismatch between an elastic stiffness of plurality of fibers 1024 and an elastic stiffness of polymeric resin matrix 1022. Again, not wishing to be bound by theory, it is believed that distortional interphase region 1028 may improve the overall mechanical performance of fiber-reinforced resin composite 1020 by providing a distortional response to the application of an applied force to fiber-reinforced resin composite 1020. A distortional response may also be referred to as a deviatoric response and is a change in shape.

In various illustrative examples, fiber-reinforced resin composite 1020 may be characterized by a ratio of the von Mises strain of distortional interphase region 1028 to the von Mises strain of polymeric resin matrix 1022. In one illustrative example, the ratio of the von Mises strain of distortional interphase region 1028 to the von Mises strain of polymeric resin matrix 1022 is greater than or equal to approximately 1.04. In another illustrative example, the ratio of the von Mises strain of distortional interphase region 1028 to the von Mises strain of polymeric resin matrix 1022 is in a range of from approximately 1.04 to approximately 1.25. In yet another illustrative example, the ratio of the von Mises strain of distortional interphase region 1028 to the von Mises strain of polymeric resin matrix 1022 is greater than or equal to approximately 1.25. In still another illustrative example, the ratio of the von Mises strain of distortional interphase region 1028 to the von Mises strain of polymeric resin matrix 1022 is a range of from approximately 1.25 to approximately 1.63. In yet another illustrative example, the ratio of the von Mises strain of distortional interphase region 1028 to the von Mises strain of polymeric resin matrix 1022 is greater than or equal to approximately 1.63.

Weight savings may be achieved in vehicles, such as aircraft, by incorporating fiber-reinforced resin composite 1020 containing distortional resin coating 1030. Fiber-reinforced resin composite 1020 containing plurality of fibers 1024 coated with number of distortional polymeric resins 1026 may exhibit improved load-bearing characteristics, pound for pound, in comparison to conventional fiber-reinforced resin composites not having distortional resin coating 1030. The different illustrative embodiments recognize and take into account that utilizing number of distortional polymeric resins 1026 as distortional resin coating 1030 for plurality of fibers 1024 of fiber-reinforced resin composite 1020 allows mechanical performance requirements and design tolerances of structural components for vehicles, such as aircraft, to be met using less material than would be required if conventional fiber-reinforced resin composites not having distortional resin coating 1030 were used, thus reducing vehicle weight and weight-sensitive operating costs.

Coating plurality of fibers 1024 with number of distortional polymeric resins 1026 prior to impregnating plurality of fibers 1024 with number of polymeric matrix resins 1023 may be a desirable method of producing fiber-reinforced resin composite 1020 and articles comprising such fiber-reinforced resin composites. The different illustrative embodiments recognize and take into account that coating plurality of fibers 1024 of fiber-reinforced resin composite 1020 with number of distortional polymeric resins 1026 prior to impregnating plurality of fibers 1024 with number of polymeric matrix resins 1023 may desirably increase the final spacing between the individual filaments of plurality of fibers 1024 in resultant fiber-reinforced resin composite 1020. Increased separation between individual filaments of plurality of fibers 1024 in fiber-reinforced resin composite 1020 reduces residual strains that may develop, for example, in multi-ply laminates during a post-cure cool-down of a manufacturing process of the multi-ply laminates. The different illustrative embodiments recognize and take into account that fiber-reinforced resin composite 1020 cured with less internal residual strains may have improved load-bearing capability and/or fatigue life than fiber-reinforced resin composites with higher internal residual strains.

The illustration of fiber-reinforced resin composite 1020 in FIG. 10 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, as depicted, number of distortional polymeric resins 1026 comprises first distortional polymeric resin 1029 and second distortional polymeric resin 1031. However, in some illustrative examples, number of distortional polymeric resins 1026 may only comprise first distortional polymeric resin 1029. In other illustrative examples, number of distortional polymeric resins 1026 may comprise more than first distortional polymeric resin 1029 and second distortional polymeric resin 1031.

As another example, as depicted, number of layers 1032 has first layer 1037 and second layer 1039. However, in some illustrative examples, number of layers 1032 may only comprise first layer 1037. In other illustrative examples, number of layers 1032 may comprise more layers than first layer 1037 and second layer 1039.

In some illustrative examples, number of layers 1032 may further comprise a third layer. First layer 1037 may comprise first distortional polymeric resin 1029 and cover plurality of fibers 1024. Second layer 1039 may comprise second distortional polymeric resin 1031 and cover first layer 1037. The third layer may comprise a third distortional polymeric resin and cover the second layer.

Figure 11:
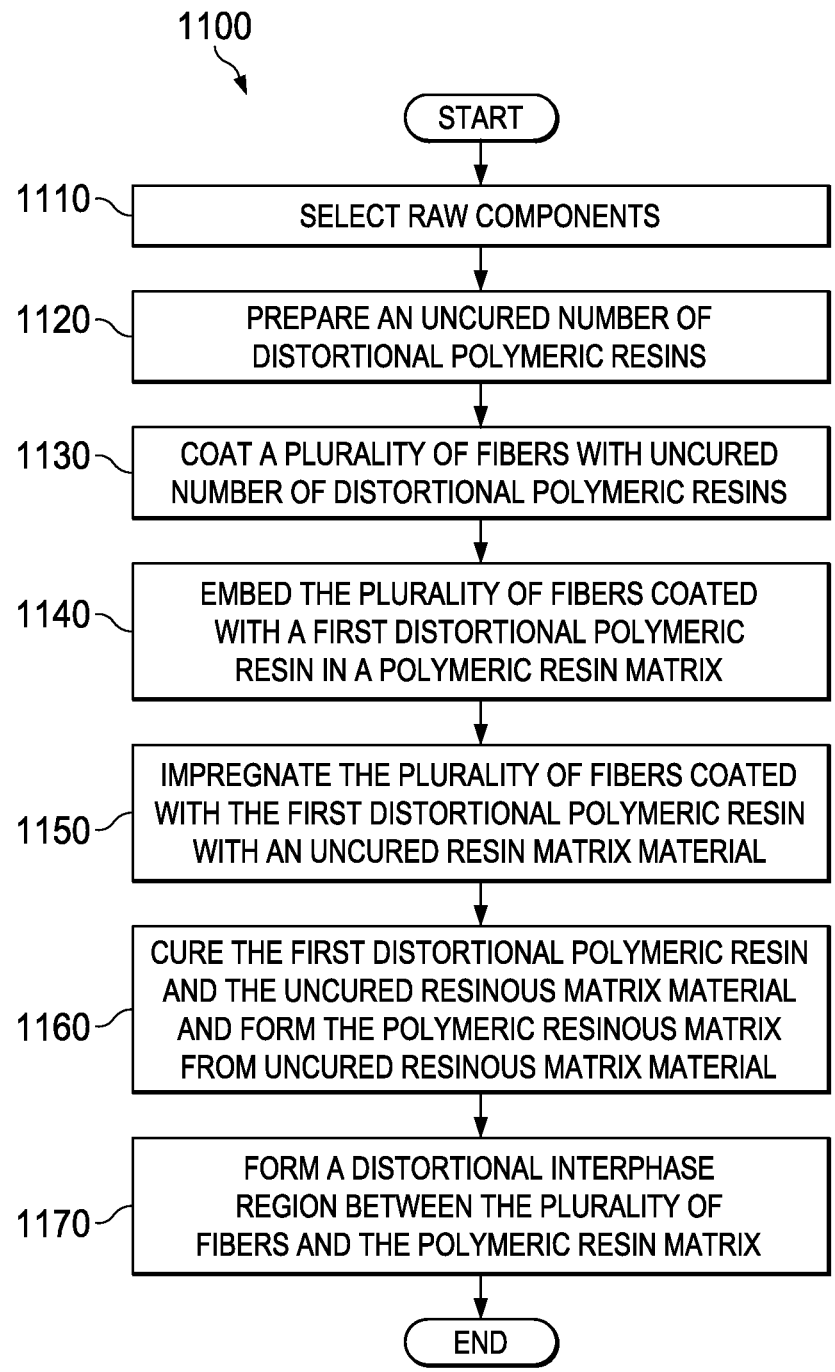
FIG. 11 is an illustration of a flowchart of a process for forming a fiber-reinforced resin composite in accordance with an illustrative embodiment.

Turning now to FIG. 11, an illustration of a flowchart of a process 1100 for forming fiber-reinforced resin composite 1020 is depicted in accordance with an illustrative example. Process 1100 may be implemented to form fiber-reinforced resin composite 1020 of FIG. 10.

Process 1100 may begin by selecting raw components (operation 1110). The raw components selected are the raw components to be used in making fiber-reinforced resin composite 1020. Selecting raw components comprises selecting a number of uncured distortional polymeric resins and/or distortional resin components of number of distortional polymeric resins 1026, a number of uncured resinous matrix materials, and plurality of fibers 1024. In some illustrative examples, selecting raw components includes selecting a curing agent.

Selecting raw components may include choosing raw components such that fiber-reinforced resin composite 1020 will have desirable material properties. Further, selecting raw components may include choosing amounts and/or relative amounts of one or more of the raw components.

Process 1100 may then prepare an uncured number of distortional polymeric resins (operation 1120). Number of distortional polymeric resins 1026 is prepared from the distortional resin components. Preparation of uncured number of distortional polymeric resins 1026 may include combining the distortional resin components. The combined distortional resin components may then be mixed and/or blended according to standard methods of blending polymer compositions from polymeric components known to those of ordinary skill in the art, thus forming uncured number of distortional polymeric resins 1026. In various illustrative examples, the combined distortional resin components are mixed and/or blended such that the resulting uncured number of distortional polymeric resins 1026 is a heterogeneous and uniform blend of the distortional resin components. In some illustrative examples, selecting raw components involves choosing distortional resin components that will form a distortional polymeric resin having a von Mises strain of greater than approximately 0.25 upon combining and curing the distortional resin components.

Process 1100 may then coat a plurality of fibers 1024 with the uncured number of distortional polymeric resins 1026 (operation 1130). In various illustrative examples, uncured number of distortional polymeric resins 1026 may be applied as a high solids resin to plurality of fibers 1024 using a hot melt technique.

In other illustrative examples, uncured number of distortional polymeric resins 1026 may be applied to plurality of fibers 1024 using a solution dip process. In a solution dip process, plurality of fibers 1024 is passed through a solution bath containing uncured number of distortional polymeric resins 1026. As fibers pass through the solution, the distortional resin components accumulate on the fibers as a coating. The fibers are then dried, evaporating the solvent from the coating and partially reacting the distortional resin components to form a partially cured distortional polymeric resin. In one such illustrative example, the distortional resin components comprise one or more distortional epoxy resins and one or more distortional amines are dissolved in a solvent to form a solution. Plurality of fibers 1024 is passed through the solution of distortional epoxy resin and distortional amine, and the distortional epoxy resin and distortional amine accumulate on the fibers as a coating. The fibers coated with the distortional epoxy resin and distortional amine are then dried, evaporating the solvent and partially reacting the distortional epoxy resin with the distortional amine.

In some illustrative examples, coating plurality of fibers 1024 with number of distortional polymeric resins 1026 results in first layer 1037. In some illustrative examples, coating plurality of fibers 1024 with number of distortional polymeric resins 1026 results in more than one layer of distortional polymeric resins 1026. In illustrative examples in which multiple layers are present, additional layers of distortional polymeric resin may be applied according to the process used to apply the first coating layer. For example, if the first coating layer was applied using the hot melt technique, the hot melt technique may also be used to apply the one or more additional coating layers of uncured distortional polymeric resin over the first coating layer of uncured distortional polymeric resin. In other illustrative examples, the one or more additional coating layers of distortional polymeric resin may be applied according to a process different from the process used to apply the first coating layer. For example, if the first coating was applied using the solution dip process, the hot melt technique may be used to apply the one or more additional coating layers of distortional polymeric resin over the first coating layer of partially cured distortional polymeric resin. In yet other illustrative examples, additional coating layers of distortional polymeric resin may be applied using different techniques. In an illustrative example, a second coating layer of a second distortional polymeric resin is applied over the first coating layer using the hot melt technique and a third coating of a third distortional polymeric resin is applied over the first coating layer using the solution dip process.

In various illustrative examples, each of the coating layers of uncured distortional polymeric resins correspond to one of the layers of distortional resin coating 1030 in FIG. 10. In some illustrative examples, plurality of fibers 1024 may be coated with two or more layers of distortional polymeric resin, the two or more layers having different von Mises strain values. In some illustrative examples, plurality of fibers 1024 may be coated with a first layer of distortional polymeric resin having a first von Mises strain greater than von Mises strain 1025 of polymeric resin matrix 1022, and the first layer of distortional polymeric resin is coated with a second layer of distortional polymeric resin having a second von Mises strain greater than the first von Mises strain and the von Mises strain of polymeric resin matrix 1022. In other illustrative examples, plurality of fibers 1024 may be coated with two or more layers of distortional resin and values of the von Mises strains of the individual layers of distortional resin decrease successively with increasing distance from plurality of fibers 1024. That is, the values of the von Mises strains of the individual layers decrease in order from plurality of fibers 1024, with the layer of distortional resin directly covering plurality of fibers 1024 having the highest von Mises strain of the individual layers and the layer directly covered by polymeric resin matrix 1022 having the lowest von Mises strain of the individual layers.

Not wishing to be bound by theory, it is believed that distortional resin coating 1030 comprising layers of distortional polymeric resin having successively decreasing von Mises strains act as a distortional deformation gradient that may provide various fiber-reinforced resin composites with further improved distortional deformation capabilities.

Process 1100 may then embed plurality of fibers 1024 coated with first distortional polymeric resin 1029 in polymeric resin matrix 1022 (operation 1140). Process 1100 may then impregnate plurality of fibers 1024 coated with first distortional polymeric resin 1029 with an uncured resinous matrix material (operation 1150). Impregnating plurality of fibers 1024 coated with first distortional polymeric resin 1029 may be performed simultaneously with embedding the fibers coated with first distortional polymeric resin 1029 in polymeric resin matrix 1022. In other words, embedding may comprise the impregnation of the fibers coated with first distortional polymeric resin 1029 with an uncured resin matrix material.

Impregnation may be carried out according to techniques well known to those of ordinary skill in the art as suitable for impregnating fibers of fiber-reinforced resin composites with resinous matrix materials. In various illustrative examples, the resultant uncured or partially cured resinous prepreg may take at least one composite form selected from prepreg tows, prepreg tapes, or prepreg fabrics.

Although the term "impregnation" is used here, in illustrative examples in which plurality of fibers 1024 is in the form of fiber preform 1027, operation 1150 may instead be referred to as resin infusion. In other words, in operation 1150, fiber preforms such as fiber preform 1027 may undergo resin infusion.

In other words, in some illustrative examples, fiber-reinforced resin composite 1020 may be fabricated according to the resin infusion process represented by blocks 36, 37, and 38 described above in connection with FIG. 9. However, in some illustrative examples, fiber-reinforced resin composite 1020 may be fabricated according to the resin infusion process represented by blocks 40 and 42 described above in connection with FIG. 9.

Process 1100 may then cure first distortional polymeric resin 1029 and the uncured resinous matrix material and form polymeric resin matrix 1022 from uncured resinous matrix material (operation 1160). As a result of curing, polymeric resin matrix 1022 may be formed from the uncured resinous matrix material and distortional resin coating 1030 comprising number of distortional polymeric resins 1026 may be formed from the number of uncured and/or partially cured distortional polymeric resins. Thus, curing first distortional polymeric resin 1029 and the uncured resinous matrix material may be performed simultaneously or substantially simultaneously with embedding the fibers coated with first distortional polymeric resin 1029 in polymeric resin matrix 1022. In other words, embedding may comprise the impregnation of the fibers coated with first distortional polymeric resin 1029 with an uncured resin matrix material.

In some illustrative examples, curing may be carried out in an autoclave. In these illustrative examples, curing is performed at elevated temperatures and pressures. In one illustrative example, curing may be carried out by applying a vacuum to a vacuum bag covering the uncured resinous matrix material. While a vacuum is pulled within the vacuum bag, pressure of 80 to 95 psig may be applied in the autoclave. While increased pressure is within the autoclave, heating may then take place including at least one of a ramp up, hold, or cool down regions. In some illustrative examples, the ramp up may include a heating rate of about 1 degree Fahrenheit to about 5 degrees Fahrenheit. The hold region may have a temperature of about 345 degrees Fahrenheit to about 365 degrees Fahrenheit. A cool down region may include a maximum cooling rate of about 5 degrees Fahrenheit.

In various illustrative examples, curing may be carried out in the presence of a curing agent. In some illustrative examples, the curing agent may facilitate reaction of the uncured resinous matrix material into polymeric resin matrix 1022 (e.g., by increasing the rate and/or degree of reaction). In some illustrative examples, the curing agent may facilitate reaction of the uncured resinous matrix material and/or polymeric resin matrix 1022 with distortional resin coating 1030 to form distortional interphase region 1028. In some illustrative examples, the curing agent may react and combine with the uncured resinous matrix material, whereby the curing agent becomes part of polymeric resin matrix 1022. In some illustrative examples, the curing agent may react and combine with distortional resin coating 1030 and/or the uncured resinous matrix material at the outer boundary of distortional resin coating 1030, whereby the curing agent becomes a part of a region of fiber-reinforced resin composite 1020 transitions from distortional polymeric resin to polymeric resin matrix 1022. In an illustrative example, the uncured resinous matrix material is cured in the presence of a curing agent comprising diaminodiphenylsulfone monomers. In an illustrative example, an uncured resinous matrix material comprising at least one of bisphenol A epoxy resin or bisphenol F epoxy resin is cured in the presence of a curing agent comprising diaminodiphenylsulfone monomers.

In some illustrative examples, process 1100 then forms distortional interphase region 1028 between plurality of fibers 1024 and polymeric resin matrix 1022 (operation 1170), with the process terminating thereafter. This operation may be optional. In some illustrative examples, a distortional interphase region may not be formed. Forming the distortional interphase region may be performed simultaneously or substantially simultaneously with embedding the fibers coated with the first distortional polymeric resin in the polymeric resin matrix.

Depending on the degree of cure achieved by the curing, distortional interphase region 1028 may be formed of distortional resin coating 1030 between plurality of fibers 1024 and polymeric resin matrix 1022. Distortional interphase region 1028 may be chemically and structurally distinct from polymeric resin matrix 1022. Distortional interphase region 1028 may be bonded to at least one of chemical functional groups of fibers of the plurality of fibers 1024 or chemical functional groups of polymeric resin matrix 1022.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, a segment, a function, and/or a portion of an operation or step.

In some alternative implementations of an illustrative embodiment, the function or functions noted in the blocks may occur out of the order noted in the figures. For example, without limitation, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram. Additionally, some blocks may be optional.

For example, as described above, operations 1140, 1150, 1160, and 1170 may be performed simultaneously or substantially simultaneously. Further, operation 1170 may not be performed. Yet further, operations 1110, 1120, and 1130 may not be performed by the same actors as the remaining operations. As a result, an actor may perform process 1100 beginning at operation 1140.

Figure 12:
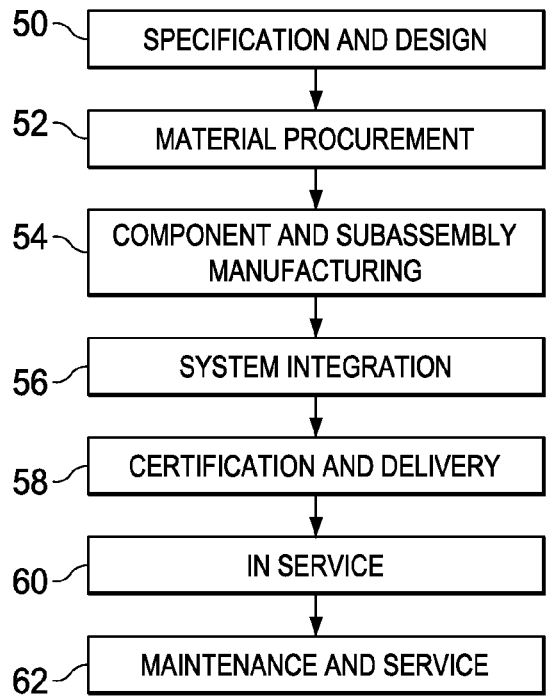
FIG. 12 is an illustration of aircraft manufacturing and service method in the form of a block diagram in accordance with an illustrative embodiment.
Figure 13:
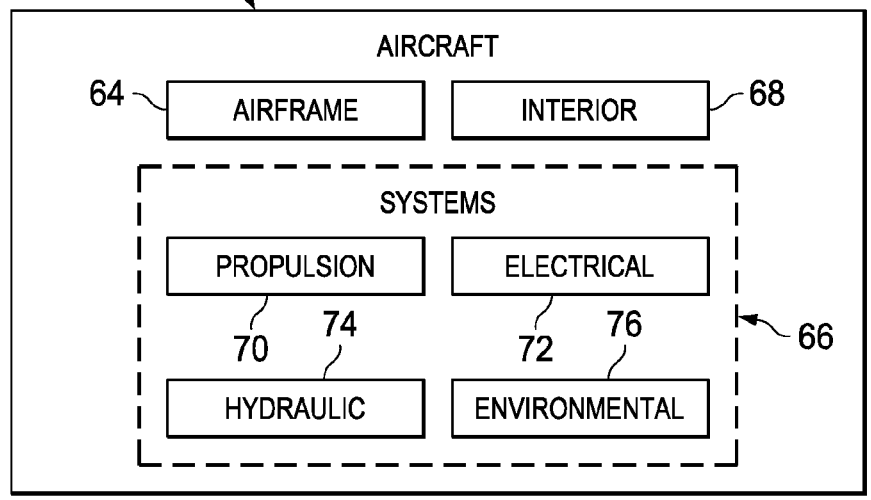
FIG. 13 is an illustration of a block diagram of an aircraft in which an illustrative embodiment may be implemented.

Referring next to FIGS. 12 and 13, illustrative examples of the disclosure may be used in the context of an aircraft manufacturing and service method 46 as shown in FIG. 12 and an aircraft 48 as shown in FIG. 13. During pre-production, exemplary method 46 may include specification and design 50 of aircraft 48 and material procurement 52. During production, component and subassembly manufacturing 54 and system integration 56 of aircraft 48 takes place. During step 54, the disclosed method and apparatus may be employed to fabricate composite parts forming parts which are then assembled at step 56. Thereafter, aircraft 48 may go through certification and delivery 58 in order to be placed in service 60. While in service by a customer, aircraft 48 may be scheduled for routine maintenance and service 62 (which may also include modification, reconfiguration, refurbishment, and so on).

Each of the processes of method 46 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 13, aircraft 48 produced by exemplary method 46 may include an airframe 64 with a plurality of systems 66 and an interior 68. The disclosed method and apparatus may be employed to fabricate composite parts that form part of airframe 64 or interior 68. Examples of high-level systems 66 include one or more of a propulsion system 70, an electrical system 72, a hydraulic system 74 and an environmental system 76. Any number of other systems may be included. Although an aerospace example is shown, the principles of the disclosure may be applied to other industries, such as the automotive industry.

The apparatus embodied herein may be employed during any one or more of the stages of the production and service method 46. For example, components or subassemblies corresponding to production process 54 may be fabricated or manufactured in a manner similar to components or subassemblies produced while aircraft 48 is in service. Also, one or more apparatus illustrative examples may be utilized during production stages 54 and 56, for example, by substantially expediting assembly of or reducing the cost of an aircraft 48. Similarly, one or more apparatus illustrative examples may be utilized while aircraft 48 is in service, for example and without limitation, to maintenance and service 62.

EXAMPLES

The following examples provide examples of distortional resins. These distortional resins may be examples of number of distortional polymeric resins 1026 of FIG. 10. In Examples 1-13, computational and experimental techniques are used to identify various distortional resins that may be suitable for use in the fiber-reinforced resin composite 1020 disclosed herein. Example 1 demonstrates the relationship between the molecular structure and composition of an epoxy resin and the value of the von Mises strain of the epoxy resin. Examples 2-11 disclose experimentally determined von Mises strains of various distortional resin compositions. Examples 12-13 disclose von Mises strains determined by quantitative chemical techniques for various distortional resin compositions.

Investigative Methodology.

Using a combination of computer simulation and experimental chemical formulation, a number of epoxy-amine formulations (such as formulations comprising at least one diamine and at least one epoxy resin as disclosed herein) have been identified that exhibit an increase in von Mises strain with respect to many existing commercially available materials.

Computer modeling was performed using molecular dynamics simulations in Materials Studio software suite from Accelrys of San Diego, Calif. When using computer modeling, von Mises values were obtained from compressive stress-strain properties derived from molecular dynamics simulations of dendritic polymers produced from each amine-epoxy combination evaluated.

The formulation methodology attempted to improve von Mises strain by selecting chemical structures that contained certain key molecular features and maximized the amount used within the constraints of a production handle-able product form. The specific amine structures selected have organic portions that contribute substantially to the overall system distortion. They have been selected for their alternating stiff phenyl rings and rotating sp3 bond hybridization centers such as ether, methylene, isopropyl or sulfone groups that allow the amine moiety to interrogate numerous torsional configurations when subjected to externally applied loads. The conformations considered are specific spatial arrangements of atoms or groups of the molecule inasmuch as the arrangements are determined by a specification of the torsion angles. The epoxy components previously available do not have similar configurations and have historically been selected because they are liquids and as such impart tack for ease of handling to the final formulation.

The measurement of von Mises strain requires fabrication and testing of a composite lamina. The fiber orientation of the test coupon may be set to 10 degrees with respect to the load application direction. The strain at failure as defined by catastrophic fracture may be recorded and analyzed using a commercial Finite Element Analysis code for determination of the maximum value of the principle strains within the body of the specimen at the instant of failure. The principle strains may then be used as input values to the von Mises equation for determination of the critical von Mises strain.

Example 1

Epoxy Resin Structure and von Mises Strain

Table 2 shows von Mises strain for a series of di-glycidyl epoxies. DEN431 is provided in the table for reference. The results demonstrate that by adding substances to the chain, increased von Mises strain results may occur. For instance, phenyl has a von Mises strain of 0.068, while phenyl-isopropyl-phenyl has a von Mises strain of 0.237, and phenyl-isopropyl-phenyl-isopropyl-phenyl has a von Mises strain of 0.386.

TABLE 2
Von Mises Strains of Selected Di-glycidyl Epoxy Resins

| Composition | Von Mises Strain |
| --- | --- |
| phenyl-isopropyl-phenyl | 0.237 |
| phenyl-isopropyl-phenyl-isopropyl-phenyl | 0.386 |
| phenyl-methylene-phenyl | 0.178 |
| phenyl-sulfone-phenyl | 0.223 |
| -phenyl- | 0.068 |
| phenyl-sulfide-phenyl | 0.159 |
| phenyl-methyl substit. methyline-phenyl | 0.283 |
| phenyl-isopropyl-phenyl-ether-2hydroxy propyl-ether-phenyl-isopropyl-phenyl | 0.182 |
| DEN 431 - phenyl-methylene-phenyl- | 0.237 |

Examples 2-13

Distortional Resin Compositions of Epoxy and Amine

A typical prior art composition is SOTA System with IM-7 which testing has shown has a von Mises strain of approximately 0.19, which is a fairly typically von Mises strain result for the prior art compositions. State of the art epoxy resin formulations for composites are usually commercial trade secrets but a typical generic formulation would consist of an epoxy such as MY721 or tetraglycidyl 4,4'-diamino diphenylemthane and 44DDS or 4,4'-diaminodiphenylsulfone mixed in a ratio of about 20 to 40% by weight of amine to epoxy. A typical von Mises strain value for a formulation such as this is in the range of 0.15 to 0.19. All seven of the following compositions disclosed have substantially improved von Mises strain results, as set forth below and set forth in TABLE 3.

Examples 2 and 3

For instance, experimental results have shown that the composition of DEN431 mixed with 33DDS has a von Mises strain of 0.295 with an amine weight percent content of 28% to 0.345 with an amine weight content of 52%. The 28% formulation represents a 1:1 stoichiometry ratio.

Examples 4 and 5

Experimental results have shown that the composition of DEN431 mixed with mBAPS has a von Mises strain of 0.322 with an amine weight percent content of 41% to 0.342 with an amine weight content of 65%. The 41% formulation represents a 1:1 stoichiometry ratio.

Examples 6 and 7

Experimental results have shown that the composition of Tactix123 mixed with 33DDS has a von Mises strain of 0.294 with an amine weight percent content of 27% to 0.345 with an amine weight content of 43%. The 27% formulation represents a 1:1 stoichiometry ratio.

Examples 8 and 9

Experimental results have shown that the composition of DEN431 mixed with APB133 has a von Mises strain of 0.313 with an amine weight percent content of 32% to 0.37 with an amine weight content of 56%. The 32% formulation represents the 1:1 stoichiometry ratio.

Examples 10 and 11

Experimental results have shown that the composition of diglycidyl c, c'-bis(4-hydroxyphenyl)-p-diisopropylbenzene (Bis M) mixed with metaBAPS has a von Mises strain of 0.41 with an amine weight percent content of 24% to 0.42 with an amine weight percent content of 32%. The 32% weight content formulation is the 1:1 stoichiometry mixture.

Example 12

Computer simulations have shown that the composition of 1,3 bis(4-aminophenoxy)-2, 2 dimethylpropane mixed with Tactix123 epoxy, with a 1:1 stoichiometric ratio of 30% by weight amine with 70% by weight epoxy, has a von Mises strain of 0.31.

Example 13

Computer simulations have shown that the composition of 1,3 bis(3-aminophenoxy)-2, 2 dimethylpropane mixed with Tactix123 epoxy, with a 1:1 stoichiometric ratio of 30% by weight amine with 70% by weight epoxy, has a von Mises strain of 0.32.

TABLE 3

Distortional Resin Compositions

| Ex. No. | Distortional Resin Composition (Epoxy \| Amine) | Amine wt % | Stoich. Ratio Epoxy: Amine | Von Mises Strain | Method Used to Determine von Mises Strain |
|---|---|---|---|---|---|
| 2 | DEN431 33DDS | 28% | 1:1 | 0.295 | Experimental |
| 3 | DEN431 33DDS | 52% | — | 0.345 | |
| 4 | DEN 431 mBAPS | 41% | 1:1 | 0.322 | Experimental |
| 5 | DEN 431 mBAPS | 65% | — | 0.342 | |
| 6 | Tactix123 epoxy 33DDS | 27% | 1:1 | 0.294 | Experimental |
| 7 | Tactix123 epoxy 33DDS | 43% | — | 0.345 | |
| 8 | DEN431 APB133 | 32% | 1:1 | 0.313 | Experimental |
| 9 | DEN431 APB133 | 56% | — | .37 | |
| 10 | diglycidyl α, α'-bis (4-hydroxyphenyl)-p-diisopropylbenzene metaBAPS | 24% | — | 0.41 | Experimental |
| 11 | diglycidyl α, α'-bis (4-hydroxyphenyl)-p-diisopropylbenzene metaBAPS | 32% | 1:1 | 0.42 | |
| 12 | 1,3 bis (4-aminophenoxy)-2, 2 dimethylpropane Tactix123 epoxy | 30% | 1:1 | 0.31 | Computer Simulation |
| 13 | 1,3 bis (3-aminophenoxy)-2, 2 dimethylpropane Tactix123 epoxy | 30% | 1:1 | 0.32 | Computer Simulation |

From our testing and computer simulations, the specific compositions which have exhibited improvements in von Mises strain include the following compositions: (1) a DEN431 substance with a 33DDS substance; (2) a DEN 431 substance with a metaBAPS substance; (3) a Tactix123 substance with a 33DDS substance; (4) a DEN431 substance with an APB133 substance; (5) a diglycidyl α,α'-bis(4-hydroxyphenyl)-p-diisopropylbenzene (Bis M) substance with a metaBAPS substance; (6) a 1,3 bis(4-aminophenoxy)-2, 2 dimethylpropane substance with a Tactix123 substance; and (7) a 1,3 bis(3-aminophenoxy)-2, 2 dimethylpropane substance with a Tactix123 substance.

The DEN431 substance comprises a Bisphenol F based tri-functional novolac epoxy resin. The metaBAPS substance comprises a 4,4' bis(3-aminophenoxy)diphenylsulfone substance. The Tactix123 substance comprises a diglycidyl ether of bisphenol-A substance. The 33DDS substance comprises a 3,3' diaminodiphenylsulfone substance. The APB133 substance comprises a 1,3 bis(3-aminophenoxy)benzene substance. It should be noted that the following substances are epoxies: DEN431; Tactix123; and diglycidyl α,α'-bis(4-hydroxyphenyl)-p-diisopropylbenzene (Bis M). Similarly, it should be noted that the following substances are amines: 33DDS; metaBAPS; APB133; 1,3 bis(4-aminophenoxy)-2, 2 dimethylpropane; and 1,3 bis(3-aminophenoxy)-2, 2 dimethylpropane.

The molecular basis for a polymer matrix ability to undergo a deviatoric response to an applied force is theorized as due to a cooperative motion of a specific volume or segment of the polymer chain. The molecular motions or dynamics of the polymer structure includes vibrational, bond bending and conformational rearrangement that can be considered as independent processes. The scale of the segmental dynamics may be determined by the local molecular environment, and the number and energy barriers to conformational rearrangements. The local environment may be limited to the scale established by the crosslinks formed during polymerization.

Simulations of these processes indicates that macroscopic loading is manifested at the molecular level as a continual disappearance of a local energy minimum due to the conformational rearrangement followed by relaxation to a new minimum. The potential energy hypersurface that represents the condition describes the glassy material as a distribution of energy minima in phase space, with maxima and saddle points that define the system dynamics. Because strain or deformation is an intensive quantity—it is proportional to the fraction of the system involved in the relaxation to a new energy minimum. Therefore more molecular structures which are able to undergo conformational exploration will enhance the polymer's ability to undergo an increased macroscopic distortional response. In addition, based on the intensive nature of deformation, using a volumetric argument for quantifying individual ingredient improvement potential has also been found to be valid.

Both experimental data and computer simulations have indicated that polymer formulations having more backbone rotational conformations and a structure optimized for exploration of dihedral conformations to maximize energy dissipation may exhibit increased distortional deformation capability. Features that may result in distortional polymeric resins include alternating stiff phenyl rings and rotating sp3 bond hybridization centers such as ether, methylene, isopropyl or sulfone groups that allow the molecule to interrogate numerous torsional configurations. On the other hand, dysfunctional epoxies containing linked sp3 centers, such as Tactix177, have not performed as well as the alternating stiff and free rotation configurations. Meta rather than para substitution on the phenyl rings has been qualitatively seen as a means to increase the possible number of potential conformers.

Figure 14:
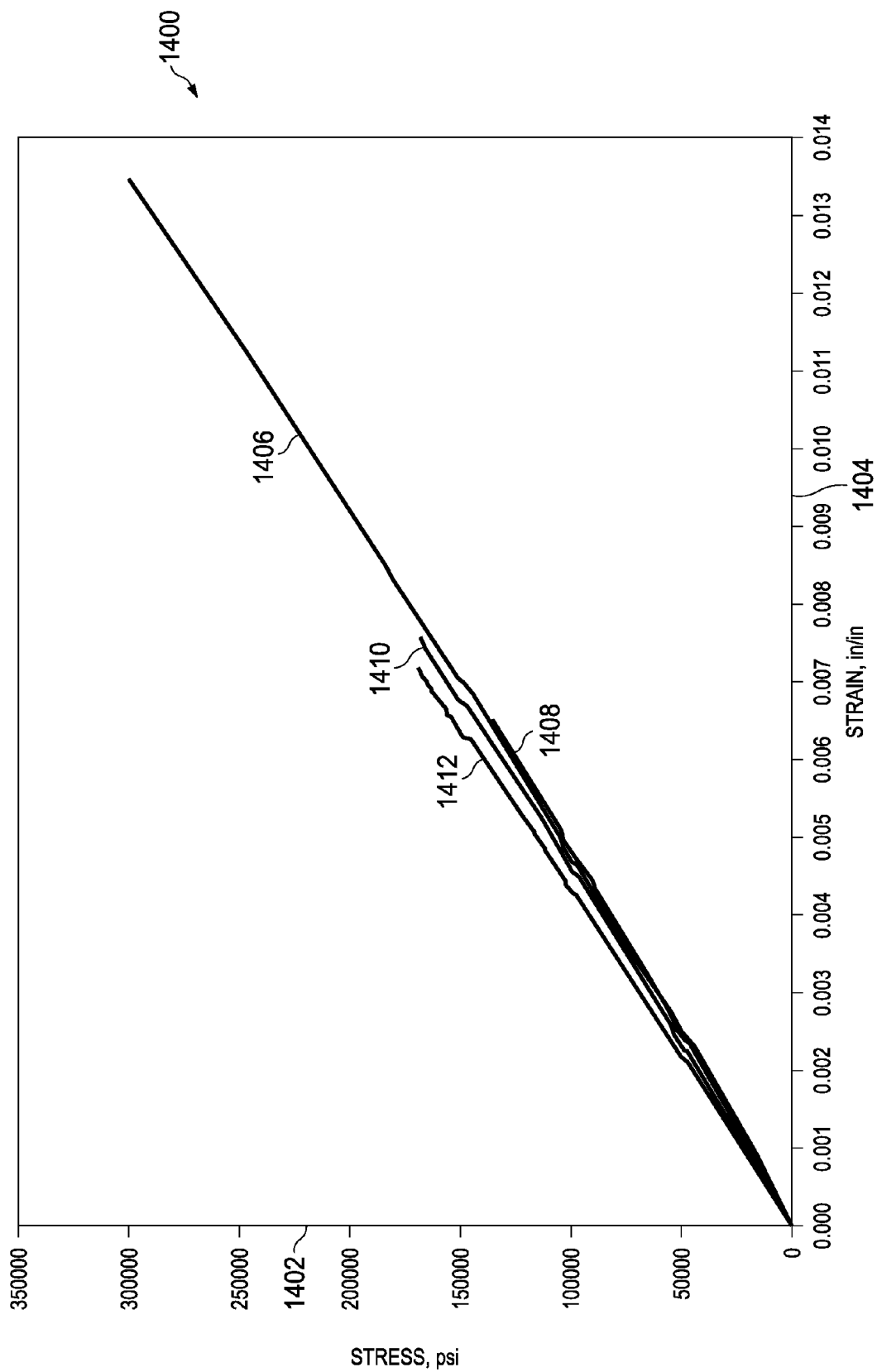
FIG. 14 is an illustration of a graph of stress vs. strain behavior for tensile coupons in accordance with an illustrative embodiment.

Turning now to FIG. 14, an illustration of a graph of stress vs. strain behavior for tensile coupons is depicted in accordance with an illustrative embodiment. The coupons each consisted of 8 ply coupons having +10 degrees and −10 degrees orientation. In this illustrative example, all of the fibers are intermediate modulus and high strength. Specifically, all of the fibers in the coupons are IM-7 fibers.

As depicted, graph 1400 comprises stress 1402, measured in pounds per square inch (psi), and strain 1404, measured in inches/inches. As depicted, 1406 is a test coupon formed of IM-7/K3B. As depicted, 1408 is a test coupon formed of IM-7/8552. As depicted, 1410 is a test coupon formed of IM-7/5250-4. As depicted, 1412 is a test coupon formed of IM-7/977-3. K3B of 1406 is the only depicted high distortional resin. None of 1408, 1410, or 1412 include high distortional resins. As can be seen from graph 1400, 1408 fails before strain 1404 of 0.007 in/in. As can be seen from graph 1400, 1410 and 1412 fail at strain 1404 of approximately 0.007 in/in. As can be seen from graph 1400, 1406 continues past strain 1404 of 0.013 in/in.

The test coupon formed of IM-7/K3B 1406 has a greater strength than the other test coupons. In this illustrative example, K3B resin may provide more efficient load transfer between the IM-7 fibers through the resin. The results indicate that increased resin distortion may improve the ability of the composite to share the global load and reach a higher failure load.

Turning now to FIG. 15, an illustration of a graph of stress vs. strain behavior for tensile coupons is depicted in accordance with an illustrative embodiment. As depicted, graph 1500 comprises stress 1502, measured in pounds per square inch (psi), and strain 1504, measured in inches/inches. As depicted, 1506 is a test coupon formed of IM-7/5250-4, 1508 is a test coupon formed of T800H/3900-2, 1510 is a test coupon formed of IM-7/977-3, 1512 is a test coupon formed of T800S/3900-2, 1514 is a test coupon formed of IM-7/8552. As depicted, 1516 is a test coupon formed of IM-7/K3B, and 1518 is a test coupon formed of a mixture of Bisphenol-A and -M epoxy with APB133 amine. As a result, only 1516 and 1518 are test coupons formed with high distortional resins.

As can be seen from FIG. 15, test coupon 1506, test coupon 1508, test coupon 1510, test coupon 1512, and test coupon 1514 behave similarly. Each of test coupon 1506, test coupon 1508, test coupon 1510, test coupon 1512, and test coupon 1514 rises quickly and fails at its peak. None of test coupon 1506, test coupon 1508, test coupon 1510, test coupon 1512, or test coupon 1514 continue past strain 1504 of 0.012 in/in. In contrast, test coupon 1516 and test coupon 1518 have two rates of increase. The first rate of increase can be seen until strain 1504 of about 0.008 in/in. The second rate of increase occurs after strain 1504 of about 0.008 in/in and continues past strain 1504 of at least 0.022 in/in.

As can be seen from FIG. 15, high distortional resins may allow composites to reach higher strains. In one theory, failure of test coupon 1516 and test coupon 1518 after strain 1504 of about 0.008 in/in may occur due to mostly resin failure.

In various illustrative examples, a fiber-reinforced resin composite comprises a polymeric resin matrix, reinforcing fibers held in the polymeric resin matrix, and a coating on the reinforcing fibers for improving load transfer between the reinforcing fibers and the polymeric resin matrix. The coating includes a first polymeric resin having a first distortional deformation capability greater than a distortional deformation capability of the polymeric resin matrix. The coating may include a first layer of the first polymeric resin and a second layer of a second polymeric resin, wherein the first distortional deformation capability of the first polymeric resin is different from a second distortional deformation capability of the second polymeric resin, and wherein the first distortional deformation capability and the second distortional deformation capability are each greater than the distortional deformation capability of the polymeric resin matrix. The fiber-reinforced resin composite may be formed by impregnating the reinforcing fibers with a bulk matrix resin, and forming the polymeric resin matrix from the bulk matrix resin. The reinforcing fibers may include at least two groups of fibers, wherein the at least two groups of fibers includes a first group of fibers and a second group of fibers. A stiffness of the first group of fibers may be different than a stiffness of the second group of fibers. A strength of the first group of fibers may be different than a strength of the second group of fibers.

In various illustrative examples, a composite is provided, wherein reinforcing fibers in the composite are coated with a polymeric resin having a relatively high distortional deformation capability compared to a distortional deformation capability of a polymeric resin matrix of the composite. The coating may create an energy dissipative, distortional interphase region surrounding the reinforcing fibers that improves resin-fiber load transfer across fiber discontinuities and/or defects, thereby improving mechanical properties of the composite. A process of coating the reinforcing fibers with the polymeric resin having the relatively high distortional deformation capability compared to the distortional deformation capability of the polymeric resin matrix may be performed prior to an impregnation of the reinforcing fibers with a bulk matrix resin from which the polymeric resin matrix is formed, thus allowing current commercially available reinforcing fibers to be utilized in existing prepreg production processes. By providing the reinforcing fibers of the composite with the coating of the polymeric resin having the relatively high distortional deformation capability compared to the distortional deformation capability of the polymeric resin matrix, the composite may have improved mechanical performance, such as increased strength and/or strain, as well as potential improvements in delamination. Composite structures employing reinforcing fibers coated with high distortional resins may result in optimized composite designs that may reduce weight and cost.

According to a further illustrative example, a fiber-reinforced resin composite comprises a polymeric resin matrix, reinforcing fibers held in the polymeric resin matrix, and a distortional interphase region having a high distortional deformation capability relative to the resin matrix. The distortional interphase region may be defined by at least a first polymeric resin coating on the reinforcing fibers. The distortional interphase region may be defined by a second polymeric resin coating over the first polymeric resin coating. The first polymeric resin coating may be a high temperature resin.

The following are nonlimiting, specific illustrative examples in accordance with the present disclosure:

A first illustrative example, which is a method of making a fiber reinforced polymer resin comprising coating reinforcing fibers with a first polymeric resin to form coated fibers; and embedding the coated fibers in a second polymeric resin, wherein a first distortional deformation capability of the first polymeric resin is greater than a second distortional deformation capability of the second polymeric resin.

A second illustrative example, which is the method of the first illustrative example wherein a first modulus of the reinforcing fibers is higher than a second modulus of the first polymeric resin.

A third illustrative example, which is the method of any of the first and second illustrative examples, further comprising selecting the reinforcing fibers from the group consisting of carbon fibers, glass fibers, organic fibers, metallic fibers, and ceramic fibers.

A fourth illustrative example, which is the method of any of the first through third illustrative examples further comprising applying a coating of a third polymeric resin over a coating of the first polymeric resin, wherein a third distortional deformation capability of the third polymeric resin is greater than the first distortional deformation capability and the second distortional deformation capability.

A fifth illustrative example, which is a method for making a fiber reinforced polymer composite, comprising forming a polymeric resin matrix; providing fibers for reinforcing the polymeric resin matrix; embedding the fibers in the polymeric resin matrix; and forming a distortional interphase region between the fibers and the polymeric resin matrix for improving load transfer between the fibers and the polymeric resin matrix.

A sixth illustrative example, which is the method of the fifth illustrative example wherein forming the distortional interphase region includes coating the fibers with a polymeric distortional resin having at least one property different from that of the polymeric resin matrix.

A seventh illustrative example, which is the method of any of the fifth and sixth illustrative examples wherein the at least one property is selected from the group consisting of fluid resistance, increased modulus, high temperature performance, processability, and handling properties.

An eighth illustrative example, which is the method of any of the fifth through seventh illustrative examples wherein embedding the fibers in the polymeric resin matrix includes impregnating the fibers with the polymeric resin matrix, and curing the polymeric resin matrix.

A ninth illustrative example, which is the method of any of the fifth through eighth illustrative examples wherein providing fibers includes selecting the fibers from the group consisting of carbon fibers, glass fibers, organic fibers, metallic fibers, and ceramic fibers.

A tenth illustrative example, which is the method of any of the fifth through ninth illustrative examples wherein providing fibers for reinforcing the resin matrix includes providing a first group of fibers and a second group of fibers, wherein a first modulus of the first group of fibers is different than a second modulus of the second group of fibers; and forming the distortional interphase region between the fibers and the polymeric resin matrix includes coating the first group of fibers with a first polymeric resin and coating the second group of fibers with a second polymeric resin, wherein each of a first distortional deformation capability of the first polymeric resin and a second distortional deformation capability of the second polymeric resin is higher than a third distortional deformation capability of the polymeric resin matrix.

An eleventh illustrative example, which is the method of any of the fifth through tenth illustrative examples wherein forming the interphase region includes coating the fibers with a polymeric distortional resin having a first distortional deformation capability greater than a second distortional deformation capability of the polymeric resin matrix, and embedding the fibers in the polymeric resin matrix includes using the coated fibers to form fiber preform 1027 and infusing fiber preform 1027 with the polymeric resin matrix.

A twelfth illustrative example, which is a fiber-reinforced resin composite having improved distortional deformation capability, comprising a polymeric resin matrix; reinforcing fibers held in the matrix; and a coating on the fibers for improving load transfer between the fibers and the matrix.

A thirteenth illustrative example, which is the fiber-reinforced resin composite of the twelve illustrative example wherein the coating includes a polymeric resin having a distortional deformation capability greater than that of the resin matrix.

A fourteenth illustrative example, which is the fiber-reinforced resin composite of any of the twelfth and thirteenth illustrative examples wherein the coating includes first and seconds layers of polymeric resin respectively having differing distortional deformation capabilities each greater than the distortional deformation capability of the resin matrix.

A fifteenth illustrative example, which is the fiber-reinforced resin composite of any of the twelfth through fourteenth illustrative examples wherein the fibers are impregnated with the matrix resin.

A sixteenth illustrative example, which is the fiber-reinforced resin composite of any of the twelve through fifteenth illustrative examples wherein the fibers include at least two groups thereof respectively having differing stiffnesses or strengths.

A seventeenth illustrative example, which is the fiber-reinforced resin composite of any of the twelfth through sixteenth illustrative examples wherein the fibers are selected from the group consisting of carbon fibers, glass fibers, organic fibers, metallic fibers, and ceramic fibers.

An eighteenth illustrative example, which is a fiber-reinforced resin composite comprising a polymeric resin matrix; reinforcing fibers held in the matrix; and an interphase region surrounding the fibers having a high distortional deformation capability relative to that of the resin matrix.

A nineteenth illustrative example, which is the fiber-reinforced resin composite of the eighteenth illustrative example wherein the interphase region is defined by at least a first polymeric resin coating on the fibers.

A twentieth illustrative example, which is the fiber-reinforced resin composite of any of the eighteenth and nineteenth illustrative examples wherein the interphase region is defined by a second polymeric resin coating over the first polymeric coating.

A twenty-first illustrative example, which is the fiber-reinforced resin composite of any of the eighteenth through twentieth illustrative examples wherein the first polymeric resin coating is a high temperature resin.

A twenty-second illustrative example, which is a method of making a fiber reinforced resin composite exhibiting improved strength, comprising providing a first group of reinforcing fibers and a second group of reinforcing fibers, wherein each of the first group of reinforcing fibers and the second group of reinforcing fibers is selected from the group consisting of carbon fibers, glass fiber, organic, metallic and ceramic fibers; forming coated fibers by applying at least one coating of a first polymeric resin having a first distortional deformation capability on each of the reinforcing fibers in the first group of reinforcing fibers and applying at least one coating of a second polymeric resin having a second distortional deformation capability on each of the reinforcing fibers in the second group of reinforcing fibers, wherein the first polymeric resin has one or more properties that are different than the properties of the second polymeric resin; forming impregnated, coated fibers by impregnating the coated fibers with a third polymeric resin having a third distortional deformation capability that is less than each of the first distortional deformation capability and the second distortional deformation capability; and curing the impregnated, coated fibers to form a substantially homogeneous resin matrix having the impregnated, coated fibers embedded therein, wherein an interphase region is present between the reinforcing fibers of the first and the second groups of the reinforcing fibers and the substantially homogeneous resin matrix that improves load transfer between the reinforcing of the first and the second groups of the reinforcing fibers and the substantially homogeneous resin matrix.

The twenty-third illustrative example, which is a fiber-reinforced resin composite comprising at least two groups of reinforcing fibers respectively having differing fiber characteristics, wherein each of the groups includes one of carbon fibers, glass fibers, organic fibers, metallic fibers and ceramic fibers; a coating of a first polymeric resin on the fibers in the first group; a coating of a second polymeric resin on the fibers in the second group; a polymeric resin matrix for holding the first and second groups of fibers and having a distortional deformation capability less than that of the first and second polymeric resins, the coatings of on the fibers forming an interphase region for improving load transfer between the fibers and the matrix.

A twenty-fourth illustrative example, which is a fiber-reinforced resin composite comprising a polymeric resin matrix; and a plurality of fibers coated with a first polymeric resin having a first von Mises strain of greater than or equal to approximately 0.25 and disposed in the polymeric resin matrix, wherein a distortional deformation capability of the first polymeric resin is greater than a distortional deformation capability of the polymeric resin matrix.

A twenty-fifth illustrative example, which is the fiber-reinforced resin composite of the twenty-fourth illustrative example wherein the first von Mises strain is greater than or equal to approximately 0.30.

A twenty-sixth illustrative example, which is the fiber-reinforced resin composite of any of the twenty-fourth and twenty-fifth illustrative examples wherein the first von Mises strain is greater than or equal to approximately 0.40.

A twenty-seventh illustrative example, which is the fiber-reinforced resin composite of any of the twenty-fourth through twenty-sixth illustrative examples wherein the polymeric resin matrix has a second von Mises strain of less than approximately 0.25.

A twenty-eighth illustrative example, which is the fiber-reinforced resin composite of any of the twenty-fourth through twenty-seventh illustrative examples wherein the second von Mises strain is in a range of from approximately 0.18 to approximately 0.24.

A twenty-ninth illustrative example, which is the fiber-reinforced resin composite of any of the twenty-fourth through twenty-eighth illustrative examples wherein the polymeric resin matrix comprises a cured epoxy resin comprising an epoxy and amine monomers.

A thirtieth illustrative example, which is the fiber-reinforced resin composite of any of the twenty-fifth through twenty-ninth illustrative examples wherein the epoxy comprises at least one of a bisphenol A epoxy resin or a bisphenol F epoxy resin, and the amine monomers comprise diaminodiphenylsulfone monomers.

A thirty-first illustrative example, which is the fiber-reinforced resin composite of any of the twenty-fifth through thirtieth illustrative examples wherein the first polymeric resin comprises at least one of the following groups (A) bisphenol F based tri-functional novolac epoxy resin and 4,4' bis(3-aminophenoxy) diphenylsulfone; (B) bisphenol F based tri-functional novolac epoxy resin and 3,3' diamino diphenylsulfone; (C) bisphenol F based tri-functional novolac epoxy resin and 1,3 bis(3-aminophenoxy) benzene; (D) diglycidyl α,α'-bis(4-hydroxyphenyl)-p-diisopropylbenzene and 4,4' bis(3-aminophenoxy) diphenylsulfone; (E) 1,3 bis(4-aminophenoxy)-2,2 dimethylpropane and diglycidyl ether of bisphenol-A; (F) diglycidyl ether of bisphenol-A and 3,3' diaminodiphenylsulfone; or (G) 1,3 bis(3-aminophenoxy)-2,2 dimethylpropane and diglycidyl ether of bisphenol-A.

A thirty-second illustrative example, which is the fiber-reinforced resin composite of any of the twenty-fifth through thirty-first illustrative examples wherein the plurality of fibers comprises at least one of carbon fibers, glass fibers, organic fibers, metallic fibers, or ceramic fibers.

A thirty-third illustrative example, which is the fiber-reinforced resin composite of any of the twenty-fifth through thirty-second illustrative examples wherein the plurality of fibers comprises at least one of first fibers having a first modulus of elasticity in a range of from approximately 33 msi to approximately 36 msi, second fibers having a second modulus of elasticity in a range of from approximately 40 msi to approximately 45 msi, or third fibers having a third modulus of elasticity of greater than approximately 45 msi.

A thirty-fourth illustrative example, which is the fiber-reinforced resin composite of any the twenty-fifth through thirty-third illustrative examples wherein the plurality of fibers comprises the first fibers and the third fibers.

A thirty-fifth illustrative example, which is the fiber-reinforced resin composite of any of the twenty-fifth through thirty-fourth illustrative examples wherein the plurality of fibers comprises the second fibers and the third fibers.

A thirty-sixth illustrative example, which is the fiber-reinforced resin composite of any of the twenty-fifth through thirty-fifth illustrative examples wherein the plurality of fibers coated with the first polymeric resin are a fiber preform 1027 impregnated with the polymeric resin matrix.

A thirty-seventh illustrative example, which is the fiber-reinforced resin composite of any of the twenty-fifth through thirty-sixth illustrative examples wherein a value of a property for the polymeric resin matrix is greater than a value of the property for the first polymeric resin, and wherein the property comprises a modulus of elasticity, a glass transition temperature, a fluid resistance, or a tack life.

A thirty-eighth illustrative example, which is the fiber-reinforced resin composite any of the twenty-fifth through thirty-seventh embodiments wherein a value of the property for the fiber-reinforced resin composite is greater than the value of the property for the first polymeric resin and less than or equal to the value for the polymeric resin matrix.

A thirty-ninth embodiment, which is the fiber-reinforced resin composite of any of the twenty-fifth through thirty-eighth illustrative examples further comprising a distortional resin coating having a first layer comprising the first polymeric resin and a second layer comprising a second polymeric resin, wherein the second layer covers the first layer, the first layer is disposed between the plurality of fibers and the second layer, and the second polymeric resin has a third von Mises strain of greater than or equal to approximately 0.25.

A fortieth illustrative example, which is the fiber-reinforced resin composite of any of the twenty-fifth through thirty-ninth illustrative examples wherein the third von Mises strain is greater than the first von Mises strain and the second von Mises strain.

A forty-first illustrative example, which is the fiber-reinforced resin composite of any of the twenty-fifth through fortieth illustrative examples further comprising an interphase region disposed between the fibers and the polymeric resin matrix, wherein the interphase region comprises the first polymeric resin.

A forty-second illustrative example, which is a fiber-reinforced resin composite, comprising a polymeric resin matrix having a first von Mises strain; fibers disposed in the polymeric resin matrix; and an interphase region surrounding the fibers having a second von Mises strain, wherein a ratio of the first von Mises strain to the second von Mises strain is greater than or equal to approximately 1.04.

The forty-third illustrative example, which is the fiber-reinforced resin composite of the forty-second illustrative example wherein the interphase region is defined by at least a first polymeric resin coating on the fibers.

A forty-fourth illustrative example, which is the fiber-reinforced resin composite of any of the forty-second and forty-third illustrative examples wherein the ratio of the first von Mises strain to the second von Mises strain is greater than or equal to approximately 1.25.

The forty-fifth illustrative example, which is the fiber-reinforced resin composite of any of the forty-second through forty-fourth illustrative examples wherein the ratio of the first von Mises strain to the second von Mises strain is greater than or equal to approximately 1.63.

A forty-sixth illustrative example, which is a method of making a fiber-reinforced resin composite, comprising embedding fibers coated with a first polymeric resin in a polymeric resin matrix, wherein a first von Mises strain of the first polymeric resin in a cured state is greater than or equal to approximately 0.25.

A forty-seventh illustrative example, which is the method of making the fiber-reinforced resin composite of the forty-sixth illustrative example further comprising forming the fibers coated with the first polymeric resin, wherein forming the fibers coated with the first polymeric resin comprises coating the fibers with the first polymeric resin.

A forty-eighth illustrative example, which is the method of making the fiber-reinforced resin composite of any one of the forty-sixth and forty-seventh illustrative examples wherein a value of a property for the polymeric resin matrix is greater than a value of the property for the first polymeric resin, and wherein the property comprises a modulus of elasticity, a glass transition temperature, a fluid resistance, or a tack life.

A forty-ninth illustrative example, which is the method of making the fiber-reinforced resin composite of any of the forty-sixth through forty-eighth illustrative examples wherein a value of the property for the fiber-reinforced resin composite is greater than the value of the property for the first polymeric resin and less than or equal to the value for the polymeric resin matrix.

A fiftieth illustrative example, which is the method of making the fiber-reinforced resin composite of any of the forty-sixth through forty-ninth illustrative examples wherein the polymeric resin matrix has a second von Mises strain in a range of from approximately 0.18 to approximately 0.24.

A fifty-first illustrative example, which is the method of making the fiber-reinforced resin composite of any of the forty-sixth through fiftieth illustrative examples wherein the first von Mises strain of the first polymeric resin in a cured state is greater than or equal to approximately 0.30.

A fifty-second illustrative example, which is the method of making the fiber-reinforced resin composite of any of the forty-sixth through fifty-first illustrative examples wherein the first von Mises strain of the first polymeric resin in a cured state is greater than or equal to approximately 0.40.

A fifty-third illustrative example, which is the method of making the fiber-reinforced resin composite any of the forty-sixth through fifty-second illustrative examples further comprising coating the fibers coated with the first polymeric resin with a second polymeric resin having a third von Mises strain, wherein the third von Mises strain is greater than the first von Mises strain and the second von Mises Strain.

A fifty-fourth illustrative example, which is the method of making the fiber-reinforced resin composite of any of the forty-sixth through fifty-third illustrative examples further comprising forming a distortional interphase region between the fibers and the polymeric resin matrix.

A fifty-fifth illustrative example, which is the method of making the fiber-reinforced resin composite of any of the forty-sixth through fifty-fourth illustrative examples wherein embedding the fibers coated with the first polymeric resin in the polymeric resin matrix comprises impregnating the fibers coated with the first polymeric resin with an uncured resinous matrix material; and curing the first polymeric resin and the uncured resinous matrix material, wherein curing forms the polymeric resin matrix from the uncured resinous matrix material.

A fifty-sixth illustrative example, which is the method of making the fiber-reinforced resin composite of any of the forty-sixth through fifty-fifth illustrative examples wherein curing the first polymeric resin and the uncured resinous matrix material forms a distortional interphase region, and wherein forming the distortional interphase region comprises reacting the first polymeric resin with chemical functional groups of at least one of the fibers, the uncured matrix material, or the polymeric resin matrix.

A fifty-seventh illustrative example, which is the method of making the fiber-reinforced resin composite any of the forty-sixth through fifty-six illustrative examples further comprising forming a fiber preform 1027 comprising the fibers coated with the first polymeric resin, and wherein impregnating the fibers coated with the first polymeric resin with the uncured resinous matrix material comprises impregnating the fiber preform 1027 with the uncured resinous matrix material.

A fifty-eighth illustrative example, which is the method of making the fiber-reinforced resin composite of any of the forty-sixth through fifty-seventh illustrative examples wherein forming the polymeric resin matrix comprises reacting the uncured resinous matrix material with a curing agent.

A fifty-ninth illustrative example, which is the method of making the fiber-reinforced resin composite of any of the forty-sixth through fifty-eighth illustrative examples wherein the uncured resinous matrix material comprises at least one of a bisphenol A epoxy resin or a bisphenol F epoxy resin, and the curing agent comprises diaminodiphenylsulfone.

A sixtieth illustrative example, which is the method of making the fiber-reinforced resin composite any of the forty-sixth through fifty-ninth illustrative examples wherein the first polymeric resin comprises at least one of the following groups (A) bisphenol F based tri-functional novolac epoxy resin and 4,4' bis(3-aminophenoxy) diphenylsulfone; (B) bisphenol F based tri-functional novolac epoxy resin and 3,3' diamino diphenylsulfone; (C) bisphenol F based tri-functional novolac epoxy resin and 1,3 bis(3-aminophenoxy) benzene; (D) diglycidyl α,α'-bis(4-hydroxyphenyl)-p-diisopropylbenzene and 4,4' bis(3-aminophenoxy) diphenylsulfone; (E) 1,3 bis(4-aminophenoxy)-2,2 dimethylpropane and diglycidyl ether of bisphenol-A; (F) diglycidyl ether of bisphenol-A and 3,3' diaminodiphenylsulfone; or (G) 1,3 bis(3-aminophenoxy)-2,2 dimethylpropane and diglycidyl ether of bisphenol-A.

A sixty-first illustrative example, which is the method of making the fiber-reinforced resin composite of any of the forty-sixth through sixtieth illustrative examples wherein the fibers comprise at least one of carbon fibers, glass fibers, organic fibers, metallic fibers, or ceramic fibers.

A sixty-second illustrative example, which is the method of making the fiber-reinforced resin composite of any of the forty-sixth through sixty-first illustrative examples wherein the fibers comprise at least one of first fibers having a first modulus of elasticity in a range of from approximately 33 msi to approximately 36 msi, second fibers having a second modulus of elasticity in a range of from approximately 40 msi to approximately 45 msi, or third fibers having a third modulus of elasticity of greater than approximately 45 msi.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:
1. A fiber-reinforced resin composite, comprising:
a polymeric resin matrix having a first von Mises strain in a range of from 0.20 to 0.24; and
a plurality of fibers coated with a first distortional polymeric resin having a second von Mises strain in a range of 0.43 to 0.45 and disposed in the polymeric resin matrix.

2. The fiber-reinforced resin composite of claim 1, wherein the first distortional polymeric resin comprises at least one of the following groups:
(A) bisphenol F based tri-functional novolac epoxy resin and 4,4' bis(3-aminophenoxy) diphenylsulfone;
(B) bisphenol F based tri-functional novolac epoxy resin and 3,3' diamino diphenylsulfone;
(C) bisphenol F based tri-functional novolac epoxy resin and 1,3 bis(3-aminophenoxy) benzene;
(D) diglycidyl $\alpha,\alpha'$-bis(4-hydroxyphenyl)-p-diisopropylbenzene and 4,4' bis(3-aminophenoxy) diphenylsulfone;
(E) diglycidyl ether of bisphenol-A and 1,3 bis(4-aminophenoxy)-2,2 dimethylpropane;
(F) diglycidyl ether of bisphenol-A and 3,3' diaminodiphenylsulfone; or
(G) diglycidyl ether of bisphenol-A and 1,3 bis(3-aminophenoxy)-2,2 dimethylpropane.

3. The fiber-reinforced resin composite of claim 1, wherein the plurality of fibers comprises at least one of carbon fibers, glass fibers, organic fibers, metallic fibers, or ceramic fibers.

4. The fiber-reinforced resin composite of claim 1, wherein the plurality of fibers comprises at least one of low modulus fibers having a first modulus of elasticity in a range of from approximately 33 msi to approximately 36 msi, intermediate modulus fibers having a second modulus of elasticity in a range of from approximately 40 msi to approximately 45 msi, or high modulus fibers having a third modulus of elasticity in a range from approximately 45 msi to approximately 85 msi.

5. The fiber-reinforced resin composite of claim 1, wherein a value of a property for the polymeric resin matrix is greater than a value of the property for the first distortional polymeric resin, and wherein the property comprises at least one of a modulus of elasticity, a glass transition temperature, a fluid resistance, or a tack life.

6. The fiber-reinforced resin composite of claim 1, further comprising a distortional resin coating having a first layer comprising the first distortional polymeric resin and a second layer comprising a second distortional polymeric resin, wherein the second layer covers the first layer and wherein the second distortional polymeric resin has a third von Mises strain in a range of approximately 0.25 to approximately 0.45.

7. The fiber-reinforced resin composite of claim 6, wherein the third von Mises strain is greater than the first von Mises strain and the second von Mises strain.

8. The fiber-reinforced resin composite of claim 1, further comprising a distortional interphase region disposed between the plurality of fibers and the polymeric resin matrix, wherein the distortional interphase region comprises the first distortional polymeric resin.

9. A method of making a fiber-reinforced resin composite, the method comprising:
embedding a plurality of fibers coated with a first distortional polymeric resin in a polymeric resin matrix, wherein a first von Mises strain of the first distortional polymeric resin in a cured state is in a range of 0.43 to 0.45, and in which a second von Mises strain of the polymeric resin matrix is in a range of from 0.20 to 0.24.

10. The method of claim 9, wherein a value of a property for the polymeric resin matrix is greater than a value of the property for the first distortional polymeric resin, and wherein the property comprises at least one of a modulus of elasticity, a glass transition temperature, a fluid resistance, or a tack life.

11. The method of claim 9, further comprising:
coating the plurality of fibers coated with the first distortional polymeric resin with a second distortional polymeric resin having a third von Mises strain, wherein the third von Mises strain is greater than the first von Mises strain and the second von Mises strain.

12. The method of claim 9, further comprising:
forming a distortional interphase region between the plurality of fibers and the polymeric resin matrix.

13. The method of claim 9, wherein embedding the plurality of fibers coated with the first distortional polymeric resin in the polymeric resin matrix comprises:
impregnating the plurality of fibers coated with the first distortional polymeric resin with an uncured resinous matrix material; and
curing the first distortional polymeric resin and the uncured resinous matrix material, wherein curing forms the polymeric resin matrix from the uncured resinous matrix material.

14. The method of claim 13, wherein curing the first distortional polymeric resin and the uncured resinous matrix material forms a distortional interphase region, and wherein forming the distortional interphase region comprises reacting the first distortional polymeric resin with chemical functional groups of at least one of the plurality of fibers, or the uncured resinous matrix material.

15. The method of claim 13, further comprising:
forming a fiber preform comprising the plurality of fibers coated with the first distortional polymeric resin, and wherein impregnating the plurality of fibers coated with the first distortional polymeric resin with the uncured resinous matrix material comprises impregnating the fiber preform with the uncured resinous matrix material.

16. The method of claim 13, wherein forming the polymeric resin matrix comprises reacting the uncured resinous matrix material with a curing agent.

17. The method of claim 9, wherein the first distortional polymeric resin comprises at least one of the following groups:
(A) bisphenol F based tri-functional novolac epoxy resin and 4,4' bis(3-aminophenoxy) diphenylsulfone;
(B) bisphenol F based tri-functional novolac epoxy resin and 3,3' diamino diphenylsulfone;
(C) bisphenol F based tri-functional novolac epoxy resin and 1,3 bis(3-aminophenoxy) benzene;
(D) diglycidyl $\alpha,\alpha'$-bis(4-hydroxyphenyl)-p-diisopropylbenzene and 4,4' bis(3-aminophenoxy) diphenylsulfone;
(E) diglycidyl ether of bisphenol-A and 1,3 bis(4-aminophenoxy)-2,2 dimethylpropane;
(F) diglycidyl ether of bisphenol-A and 3,3' diaminodiphenylsulfone; or
(G) diglycidyl ether of bisphenol-A and 1,3 bis(3-aminophenoxy)-2,2 dimethylpropane.

* * * * *